March 5, 1940.  D. H. MONTGOMERY ET AL  2,192,198
MACHINE TOOL
Filed April 22, 1937   19 Sheets-Sheet 1

INVENTORS
DONALD H. MONTGOMERY
ARTHUR H. JOBERT
BY
ATTORNEYS

March 5, 1940. D. H. MONTGOMERY ET AL 2,192,198
MACHINE TOOL
Filed April 22, 1937 19 Sheets-Sheet 3

INVENTORS
DONALD H. MONTGOMERY
ARTHUR H. JOBERT
BY
ATTORNEYS

March 5, 1940. D. H. MONTGOMERY ET AL 2,192,198
MACHINE TOOL
Filed April 22, 1937 19 Sheets-Sheet 4
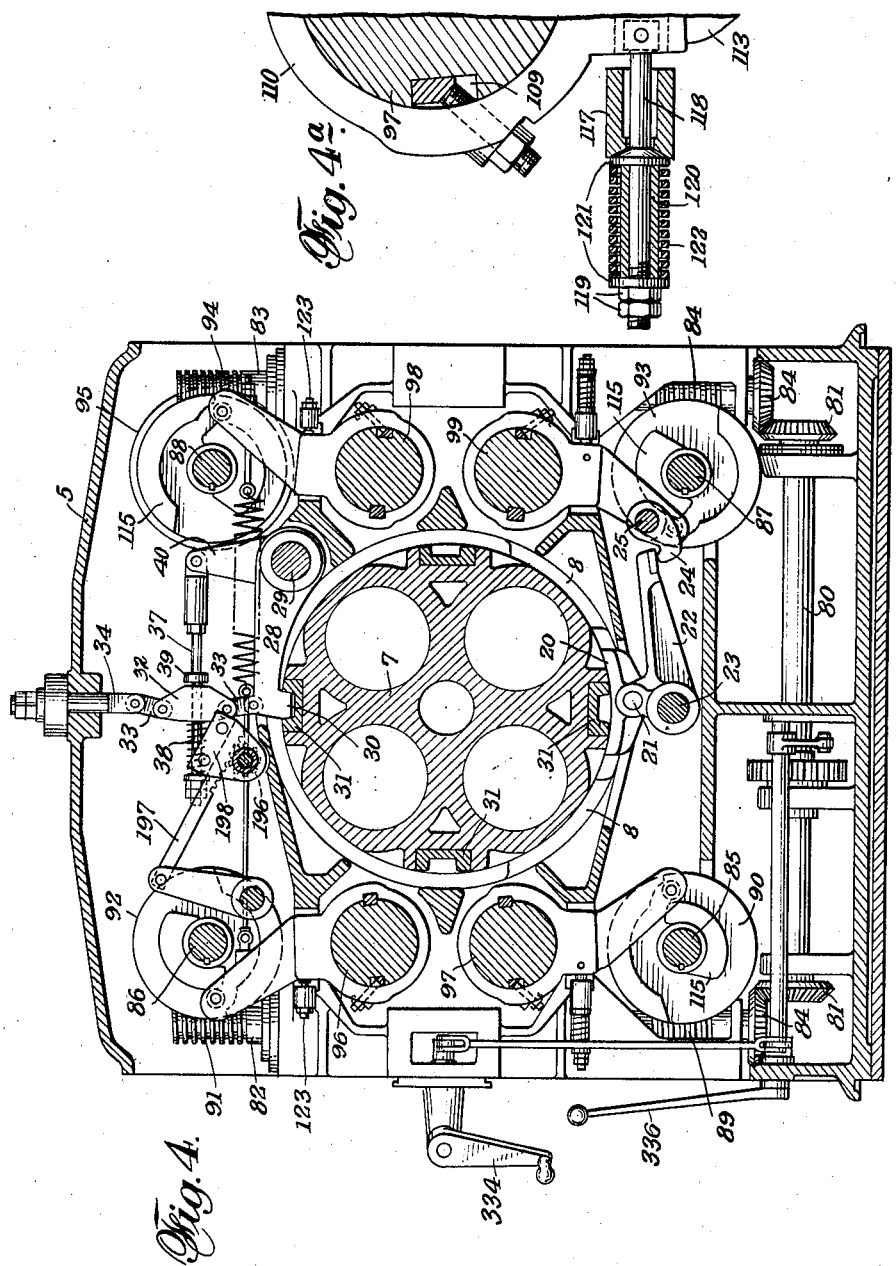
INVENTORS
DONALD H. MONTGOMERY
ARTHUR H. JOBERT
BY
ATTORNEYS

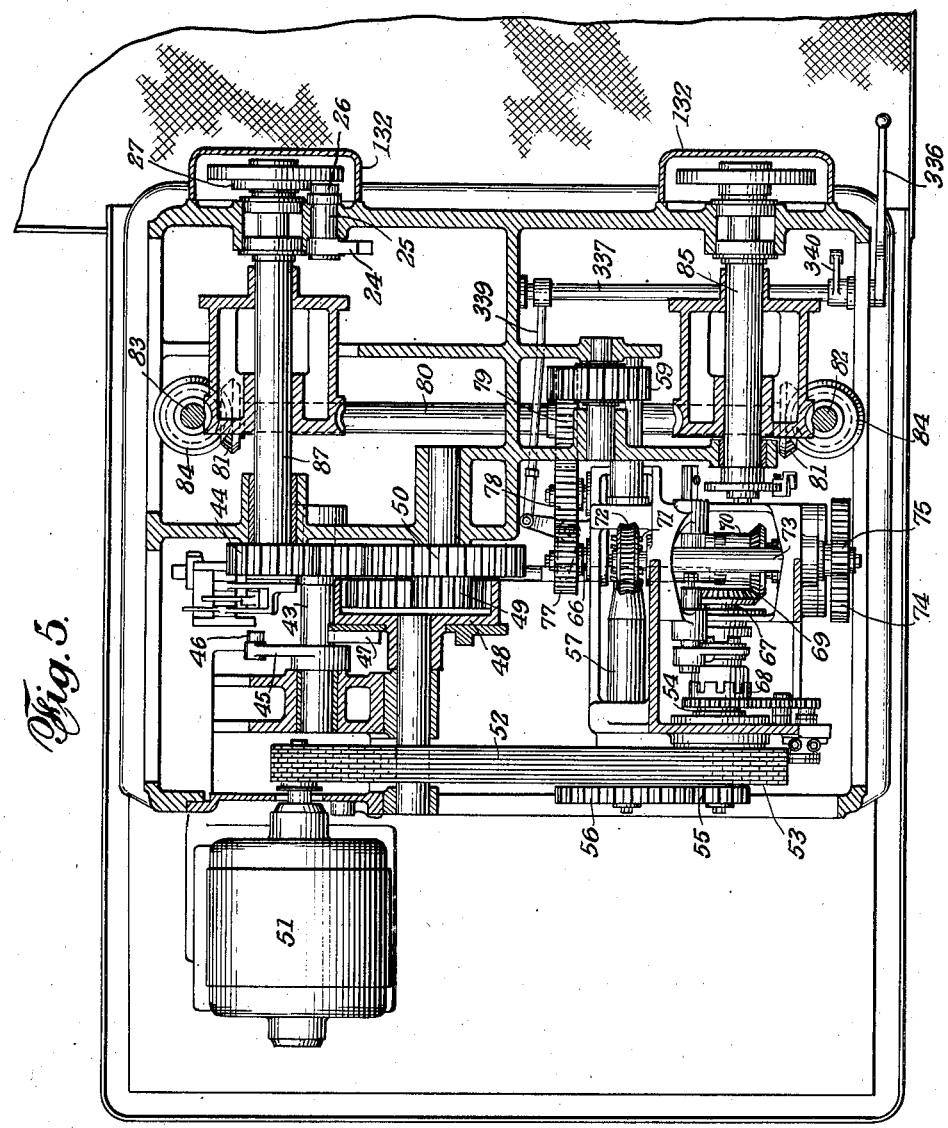

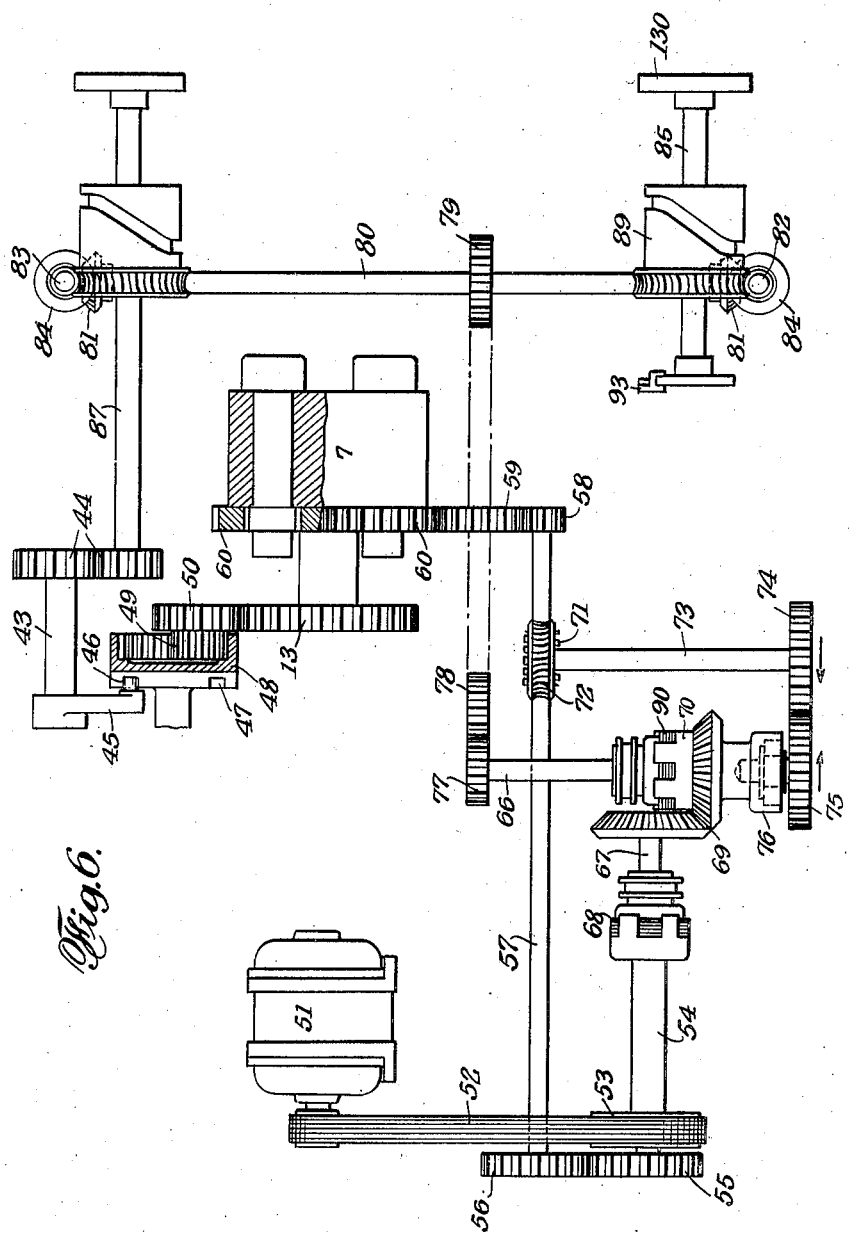

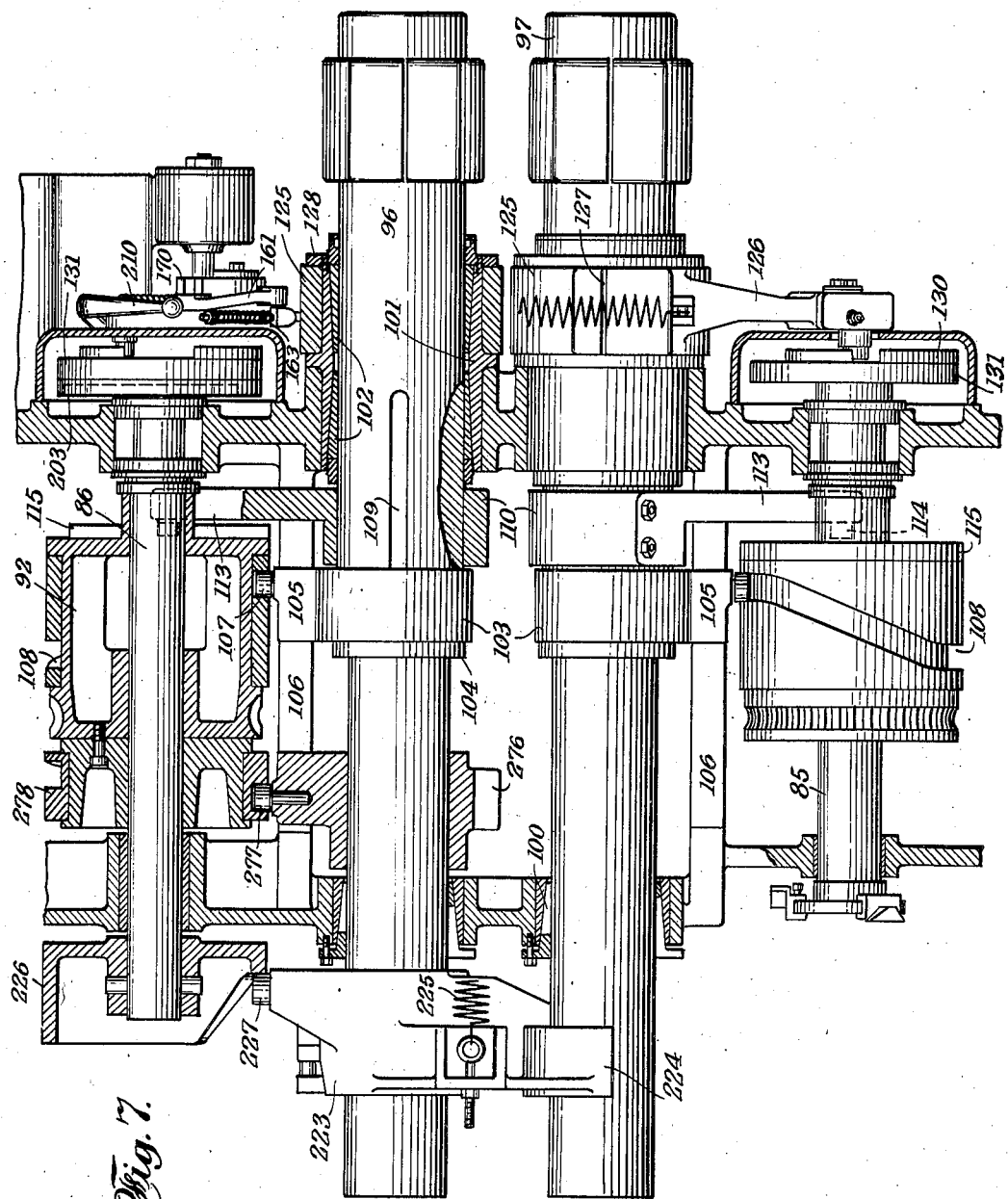

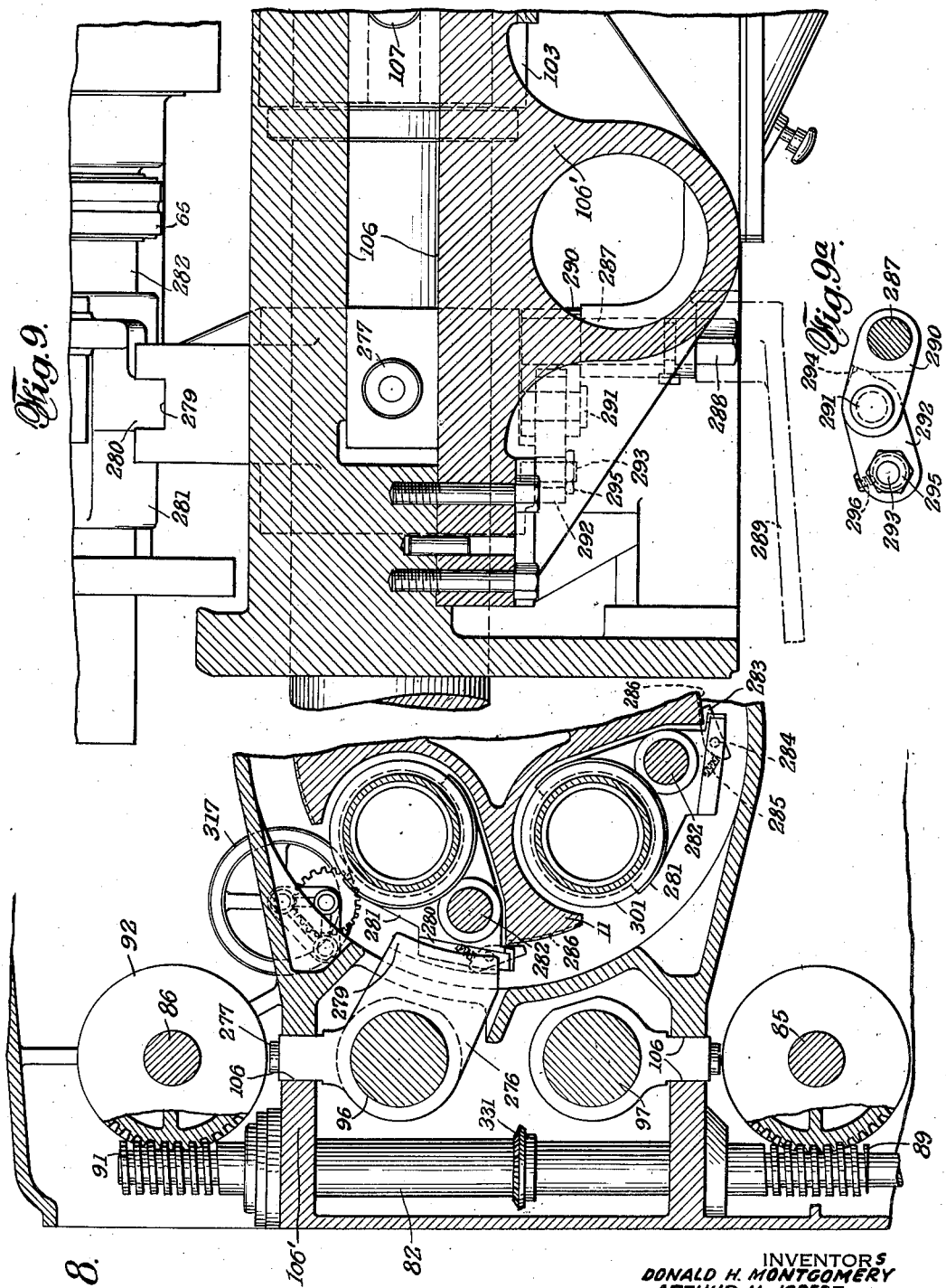

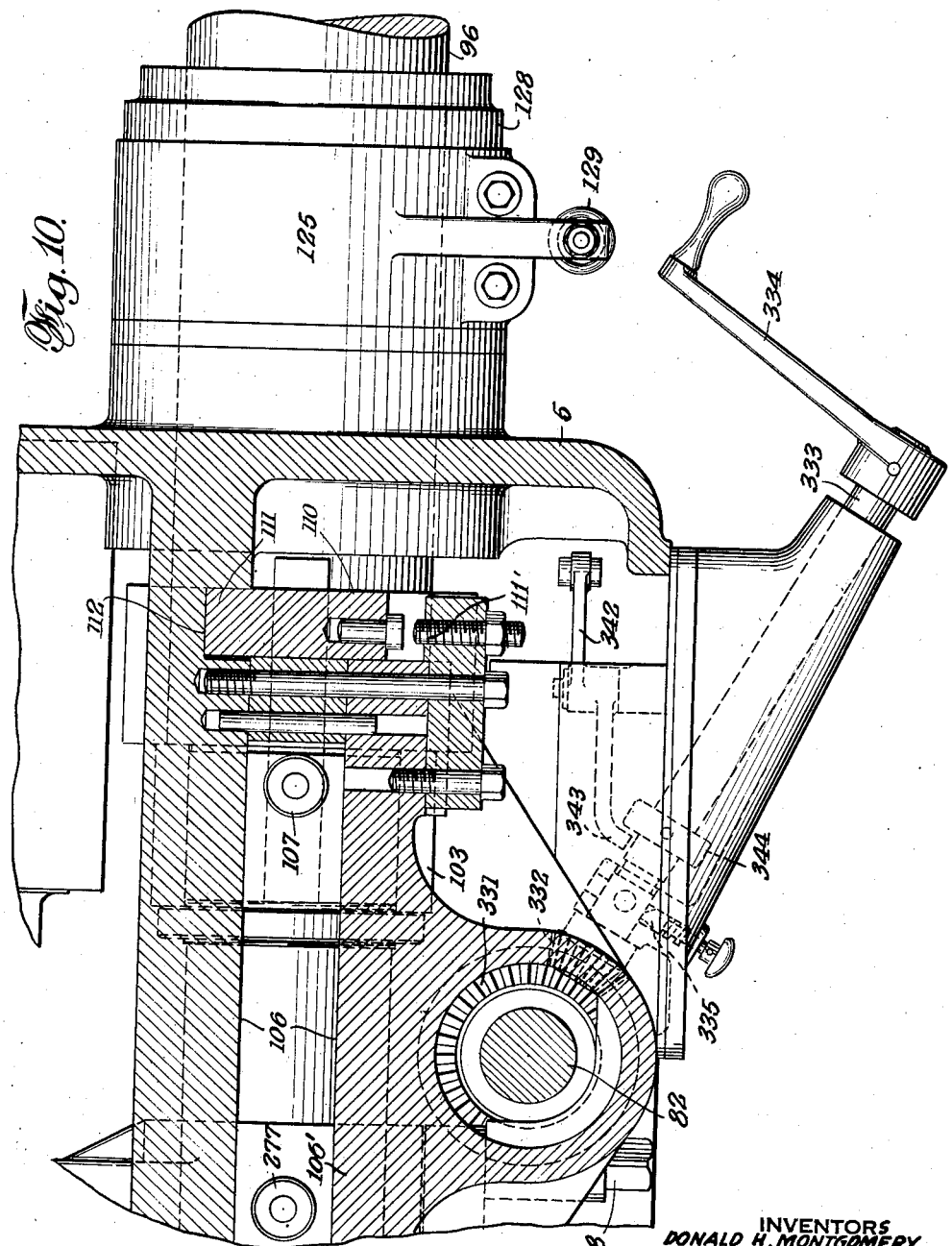

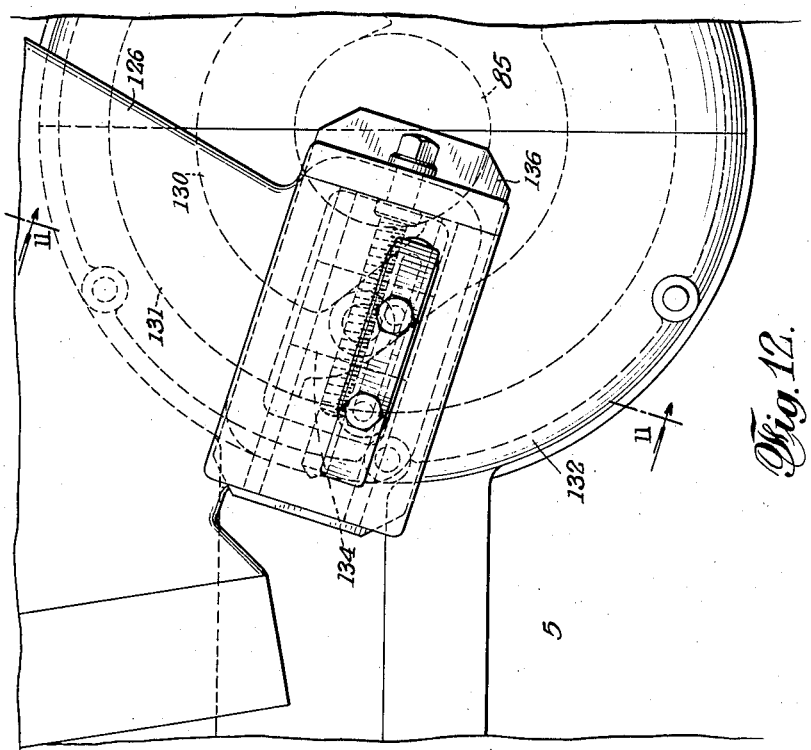
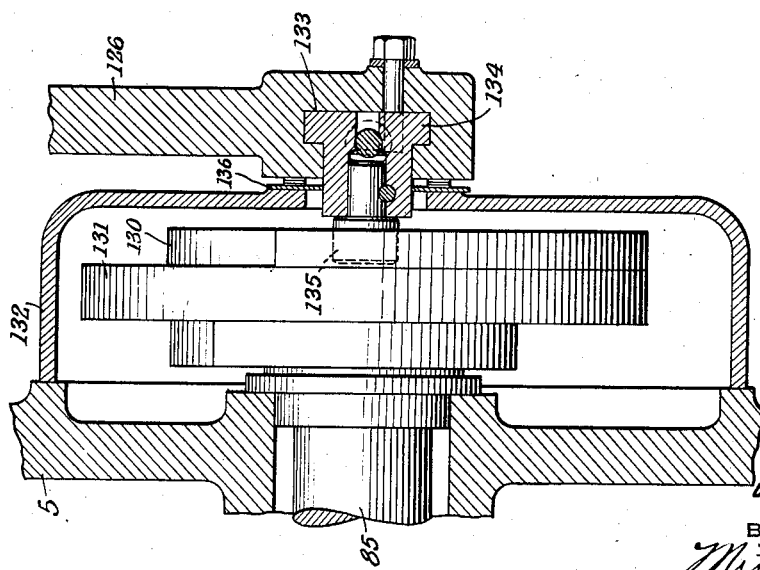

March 5, 1940. D. H. MONTGOMERY ET AL 2,192,198
MACHINE TOOL
Filed April 22, 1937 19 Sheets-Sheet 11

INVENTORS
DONALD H. MONTGOMERY
ARTHUR H. JOBERT
BY
ATTORNEYS

March 5, 1940.   D. H. MONTGOMERY ET AL   2,192,198
MACHINE TOOL
Filed April 22, 1937   19 Sheets-Sheet 12

INVENTORS
DONALD H. MONTGOMERY
ARTHUR H. JOBERT
BY
ATTORNEYS

March 5, 1940. D. H. MONTGOMERY ET AL 2,192,198
MACHINE TOOL
Filed April 22, 1937 19 Sheets-Sheet 13

INVENTORS
DONALD H. MONTGOMERY
ARTHUR H. JOBERT
BY
ATTORNEYS

March 5, 1940. D. H. MONTGOMERY ET AL 2,192,198
MACHINE TOOL
Filed April 22, 1937 19 Sheets-Sheet 14
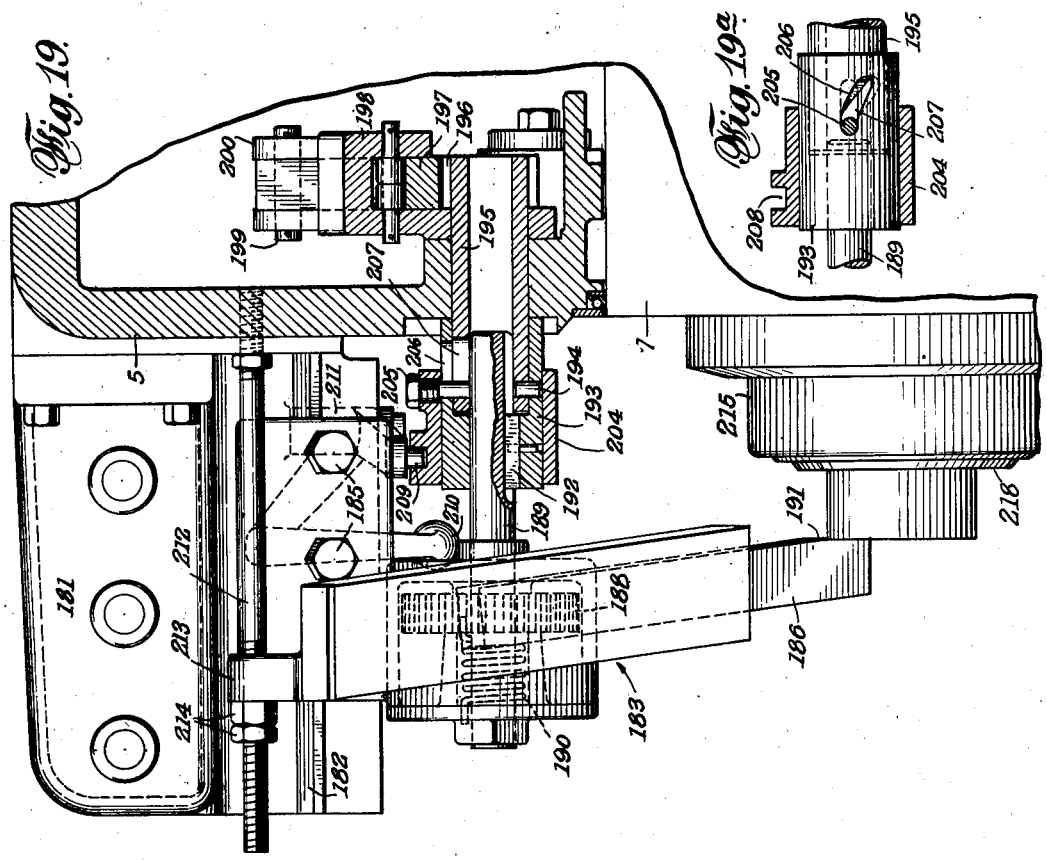
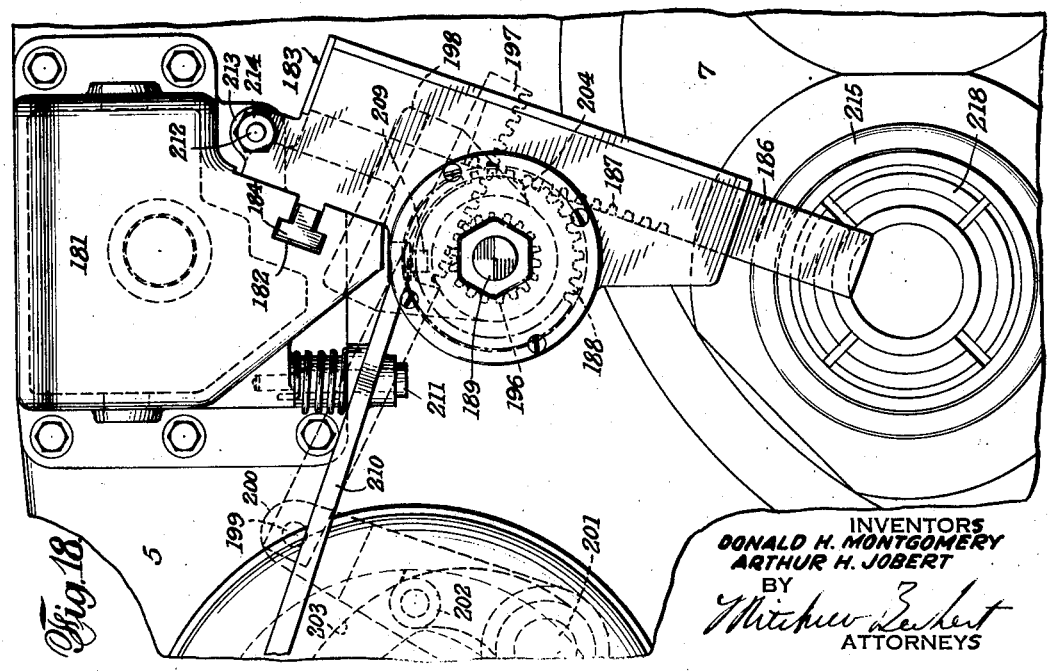
INVENTORS
DONALD H. MONTGOMERY
ARTHUR H. JOBERT
BY
ATTORNEYS

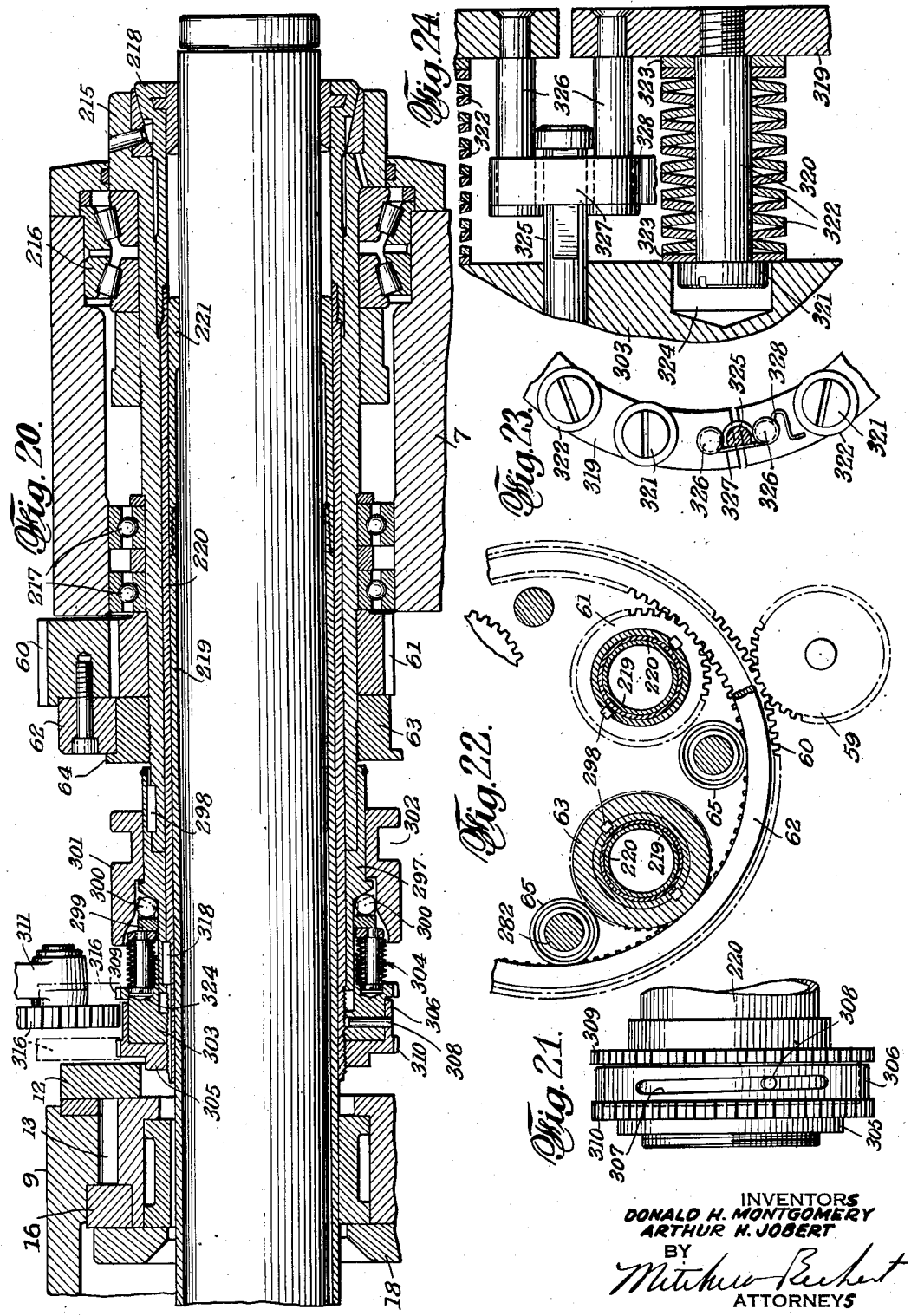

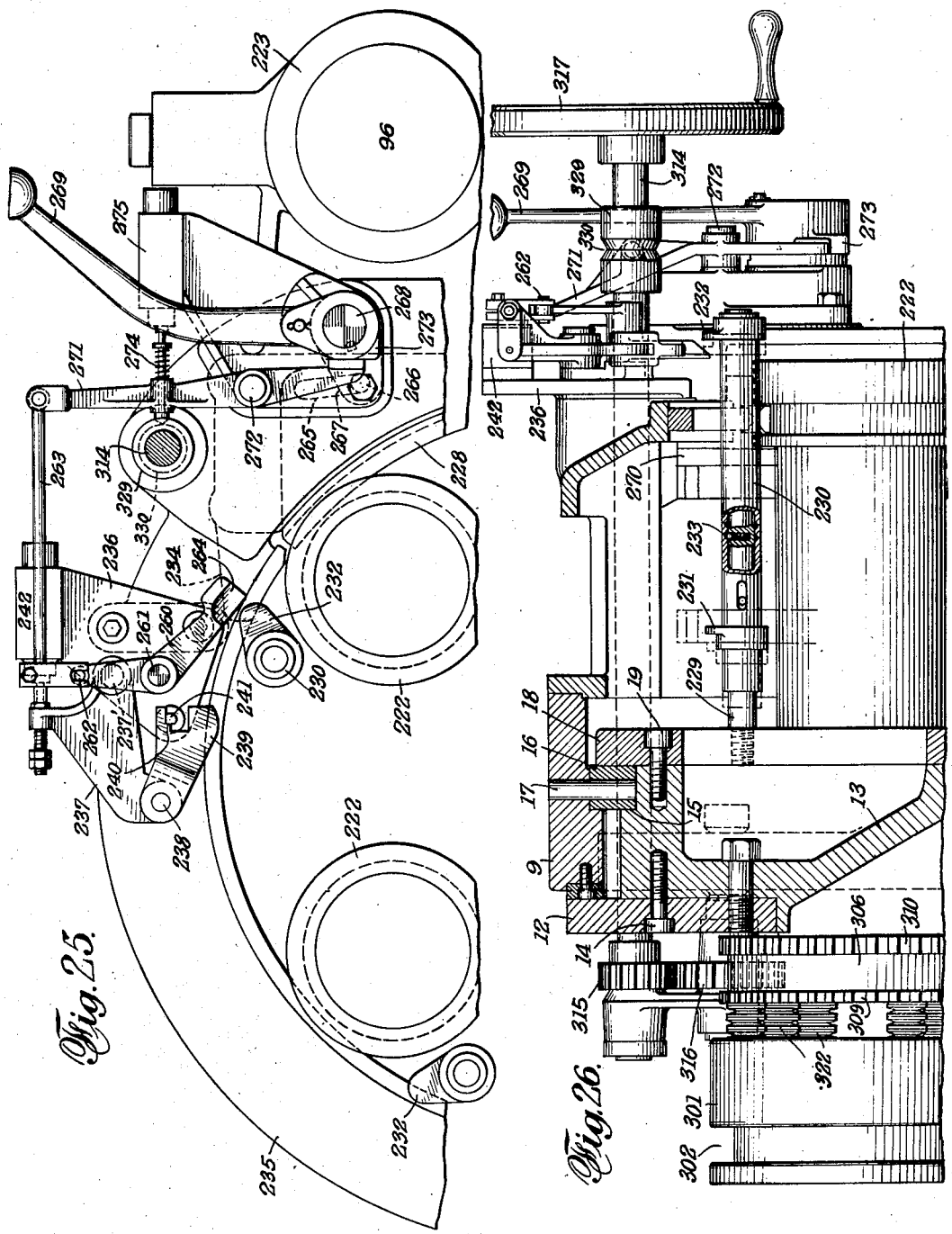

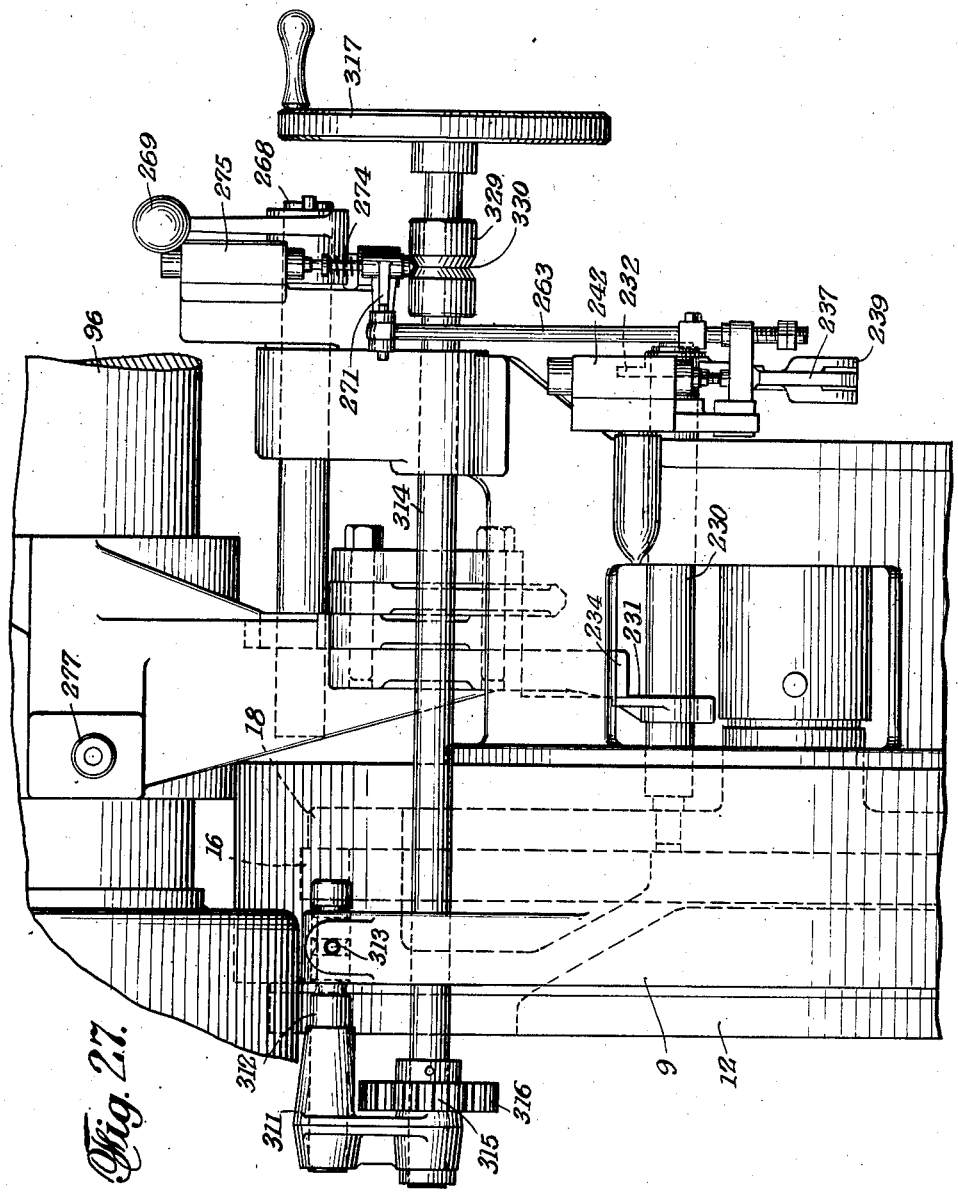

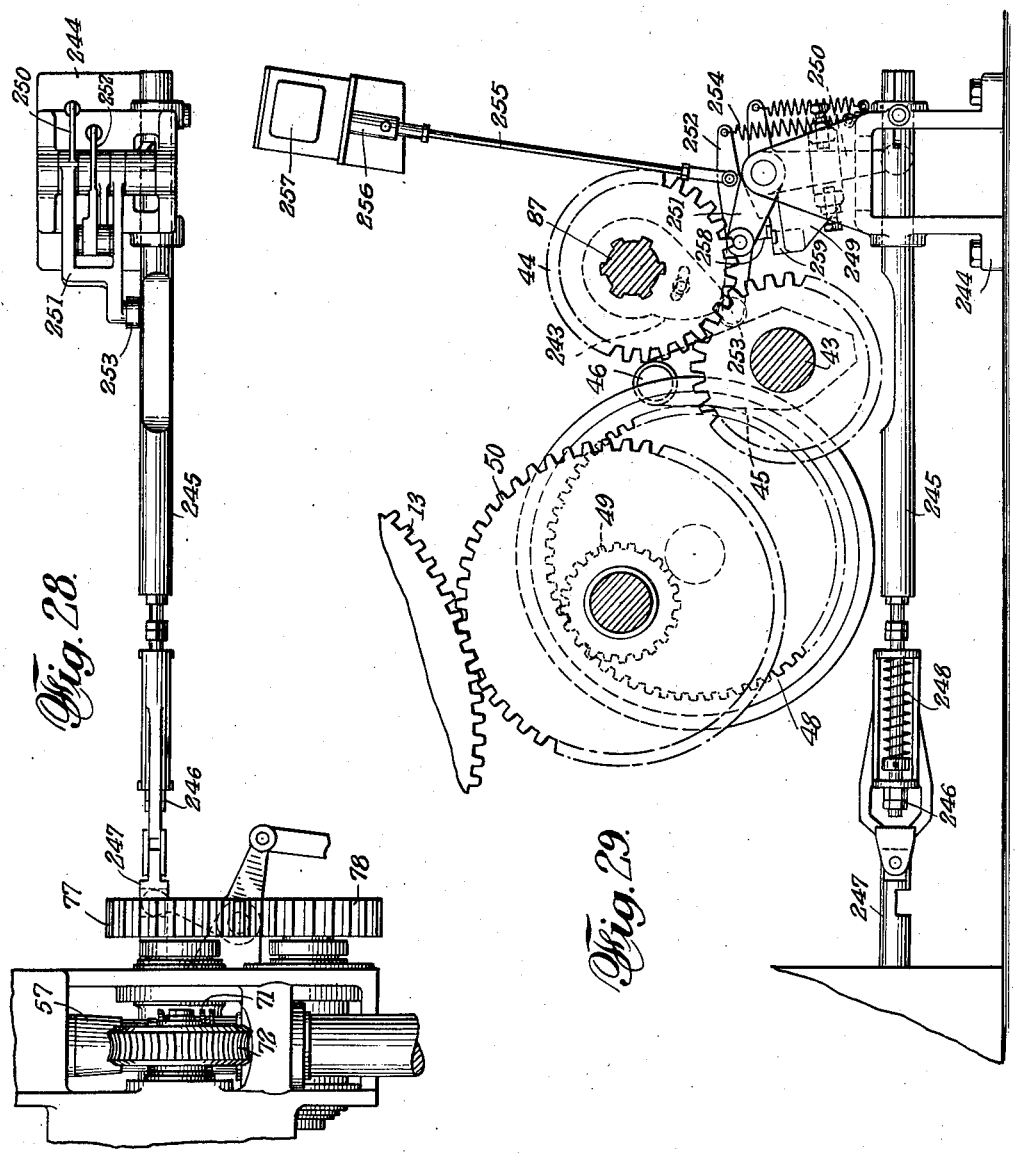

March 5, 1940.  D. H. MONTGOMERY ET AL  2,192,198
MACHINE TOOL
Filed April 22, 1937   19 Sheets-Sheet 19
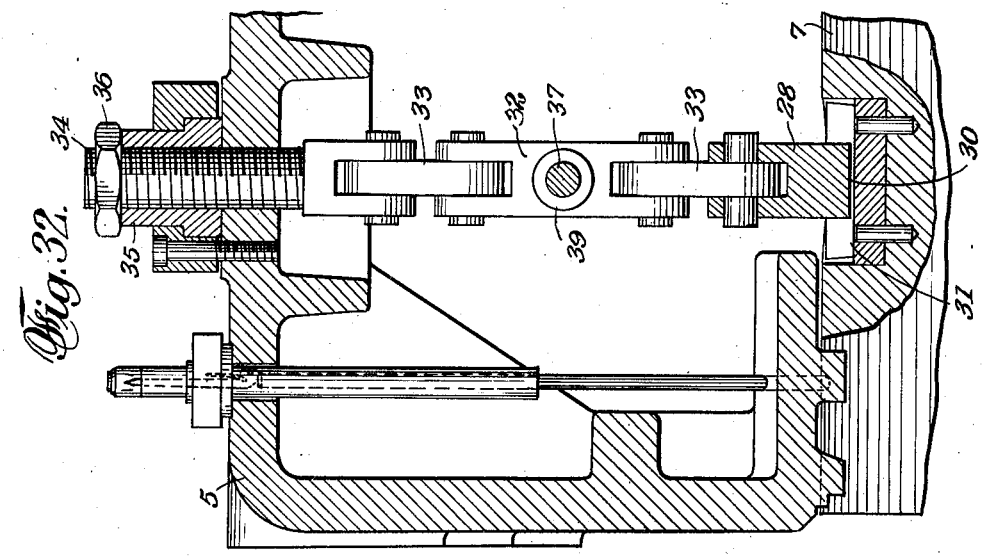
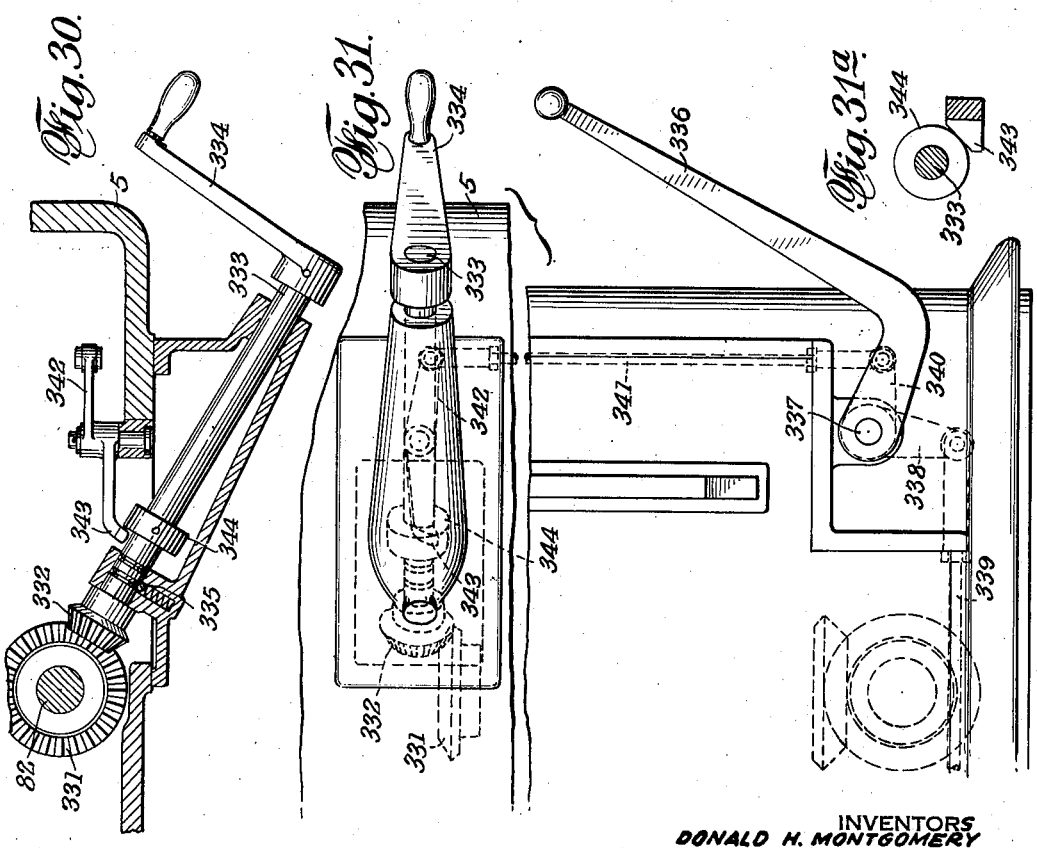
INVENTORS
DONALD H. MONTGOMERY
ARTHUR H. JOBERT
BY
ATTORNEYS Patented Mar. 5, 1940

2,192,198

UNITED STATES PATENT OFFICE 2,192,198

MACHINE TOOL

Donald H. Montgomery, West Hartford, and Arthur H. Jobert, New Britain, Conn., assignors to The New Britain Machine Company, New Britain, Conn., a corporation of Connecticut Application April 22, 1937, Serial No. 138,282

46 Claims. (Cl. 29—37)

Our invention relates to a machine tool and will be illustrated as embodied in a multiple spindle bar machine. Certain features of the invention are of importance only in connection with a multiple spindle machine, while other features of the invention are of broader application and may be advantageously embodied in machines and types of machines other than as herein specifically disclosed.

It is the general object of the invention to provide an improved form of machine of the character indicated, capable of turning out work pieces having great accuracy of dimension and with rapidity and in which the work and tools are readily accessible and may be easily observed.

It is a more specific object of the invention to provide an open-end multiple spindle machine of the character indicated, in which the work and tools may be clearly observed directly from the front of the machine and adjustments readily made.

Another object is to provide a machine of the character indicated with a plurality of tools so arranged as to conserve space and permit a greater number and variety of tools to be employed than has heretofore been feasible without undue complication or enlargement of the machine.

Another object is to provide a machine of the character indicated with improved means for simultaneously cutting off and back facing a work piece.

It is another object to provide an improved means for taking end thrusts of the work carrier.

A further object is to provide an improved work carrier assembly and means for supporting the same for easy and wear-free indexing.

It is another object to provide improved means for locating and locking the indexible carrier in indexed position.

It is another object to provide improved chucking means and means for preventing accidental unchucking in work stations.

Another object is to provide improved collet or chuck adjusting means and which is readily accessible for quick adjustment.

It is another object to provide chuck or collet adjusting means, together with means for automatically preventing accidental or intentional spindle actuation during adjustment.

Another object is to provide compensating mechanism for a collet or chuck, which will permit satisfactory chucking of work pieces of substantially different sizes and which may be readily applied and removed without substantial dismantling operations.

A further object is to provide improved means for stopping the machine or at least the feed works thereof upon a run-out of stock and after completion of machining operations on the last piece.

It is another object to provide improved means for simultaneously driving a plurality of spindles.

Several other objects and various features of invention will either be hereinafter pointed out or will become apparent upon a study of the illustrated disclosure of the invention.

In the drawings which show, for illustrative purposes only, a preferred form of the invention as embodied in a multiple spindle indexing type of bar machine—

Fig. 4 is a sectional view taken substantially in the plane of the line 4—4 of Fig. 1;

Figure 1:
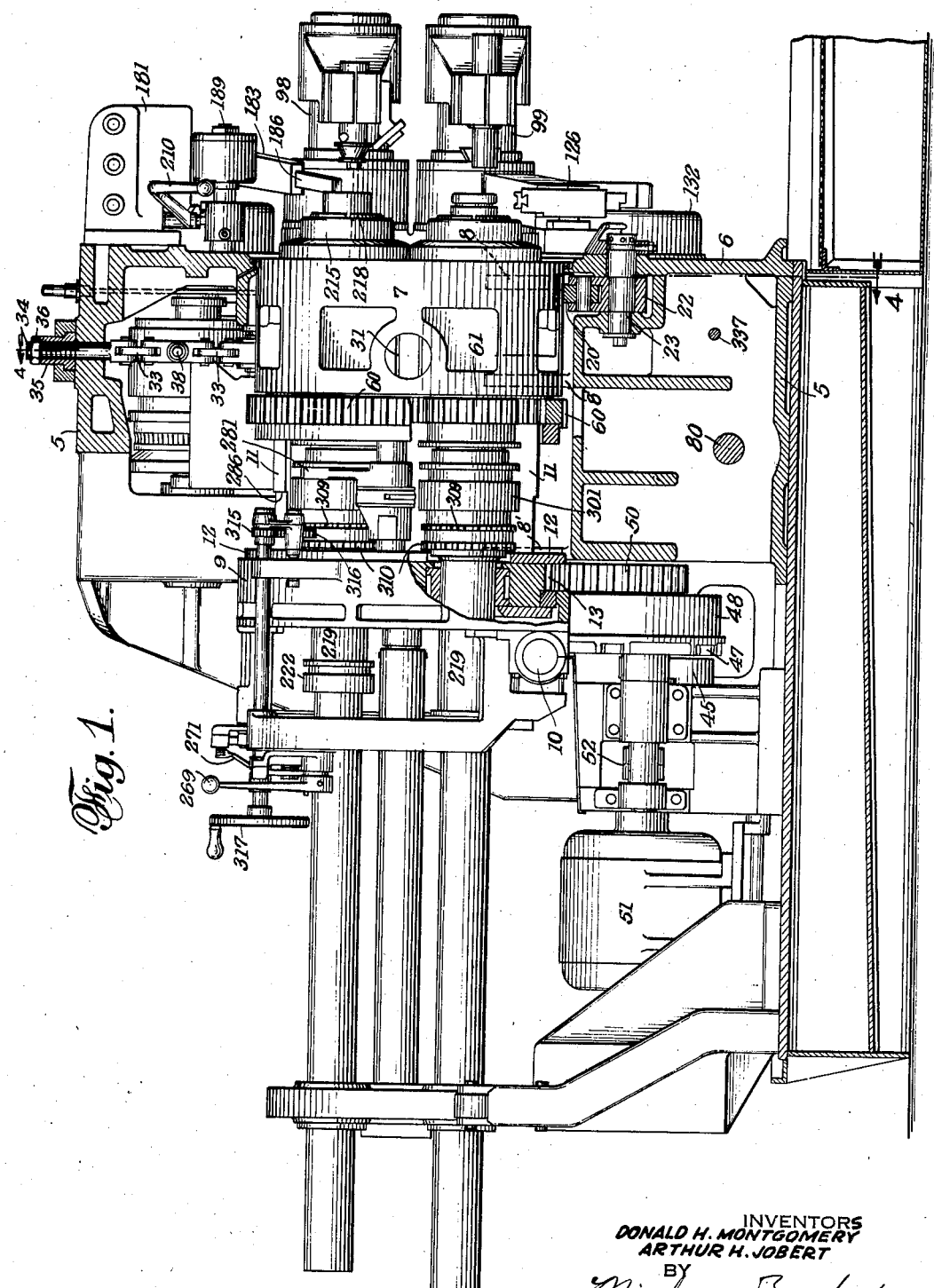
Fig. 1 is a side view in partial central section of a complete machine, illustrating various features of the invention.
Figure 2:
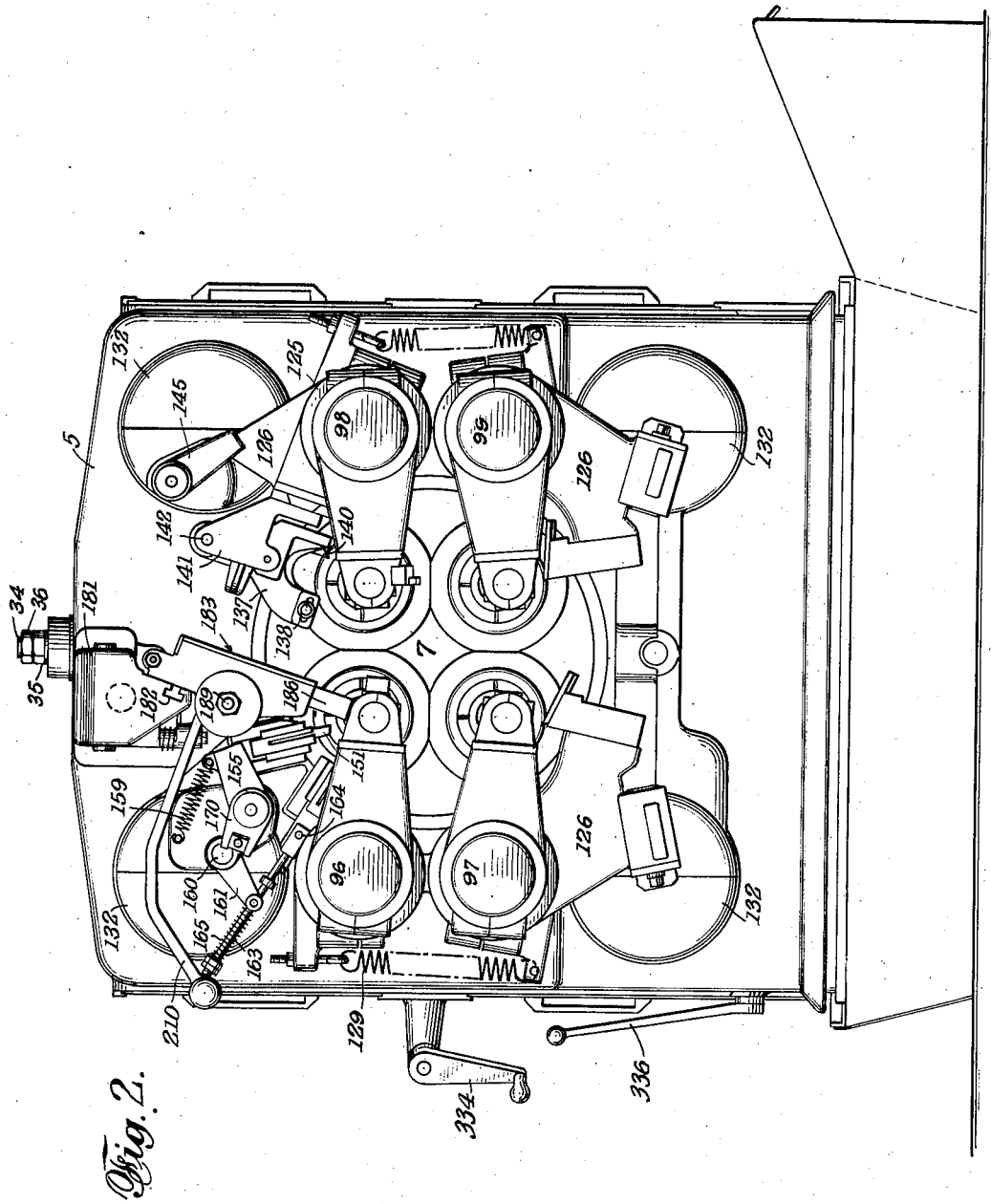
Fig. 2 is a view in front end elevation of the machine shown in Fig. 1.
Figures 13, 14:
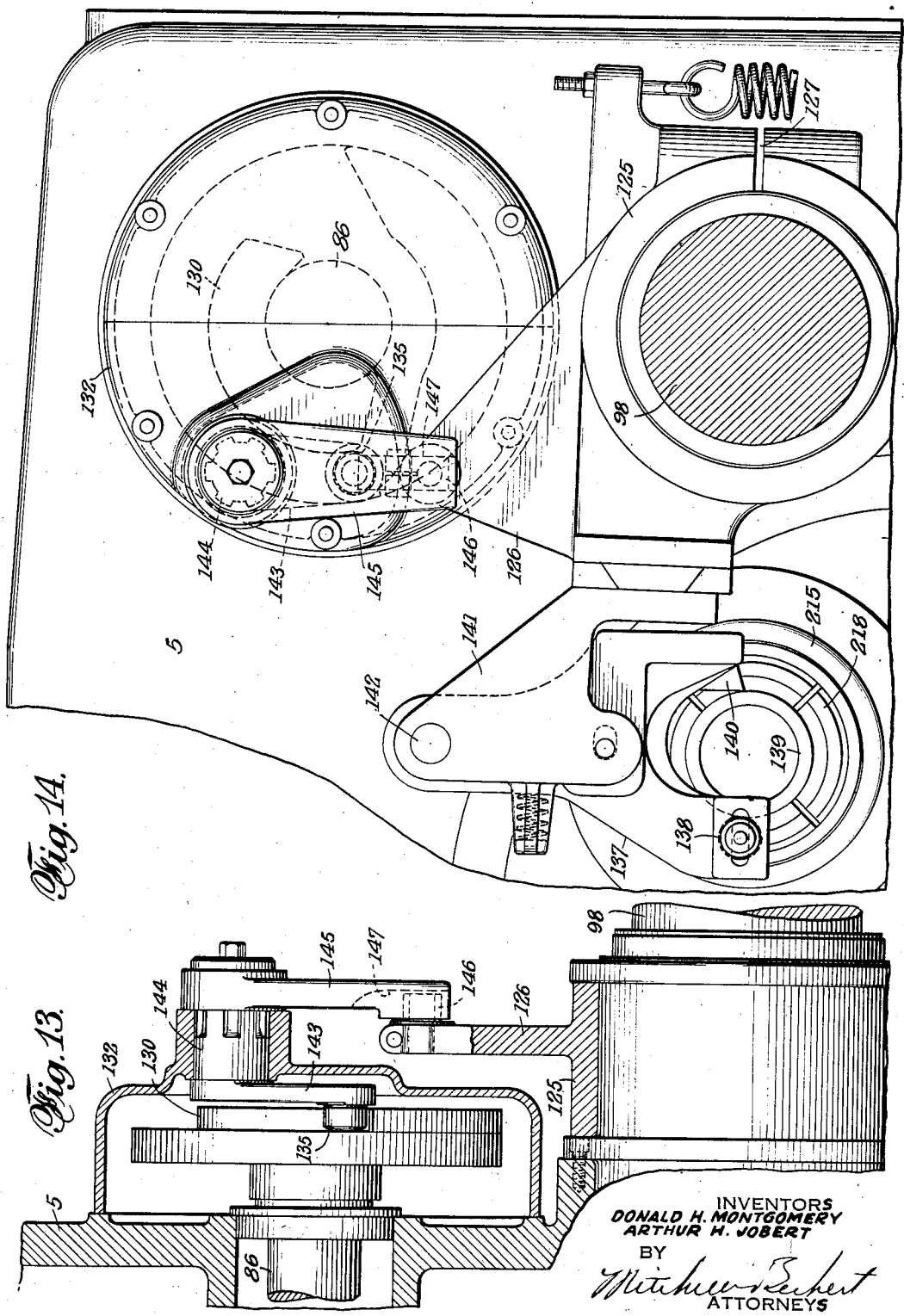
Figure 16:
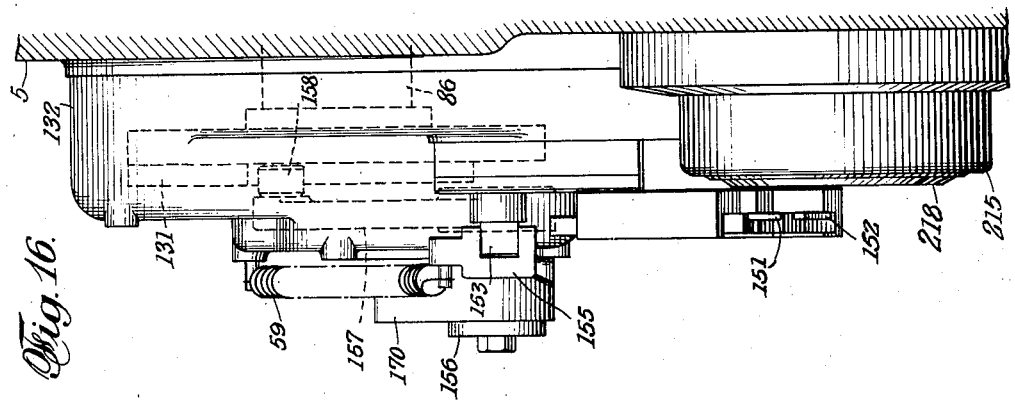
Figure 15:
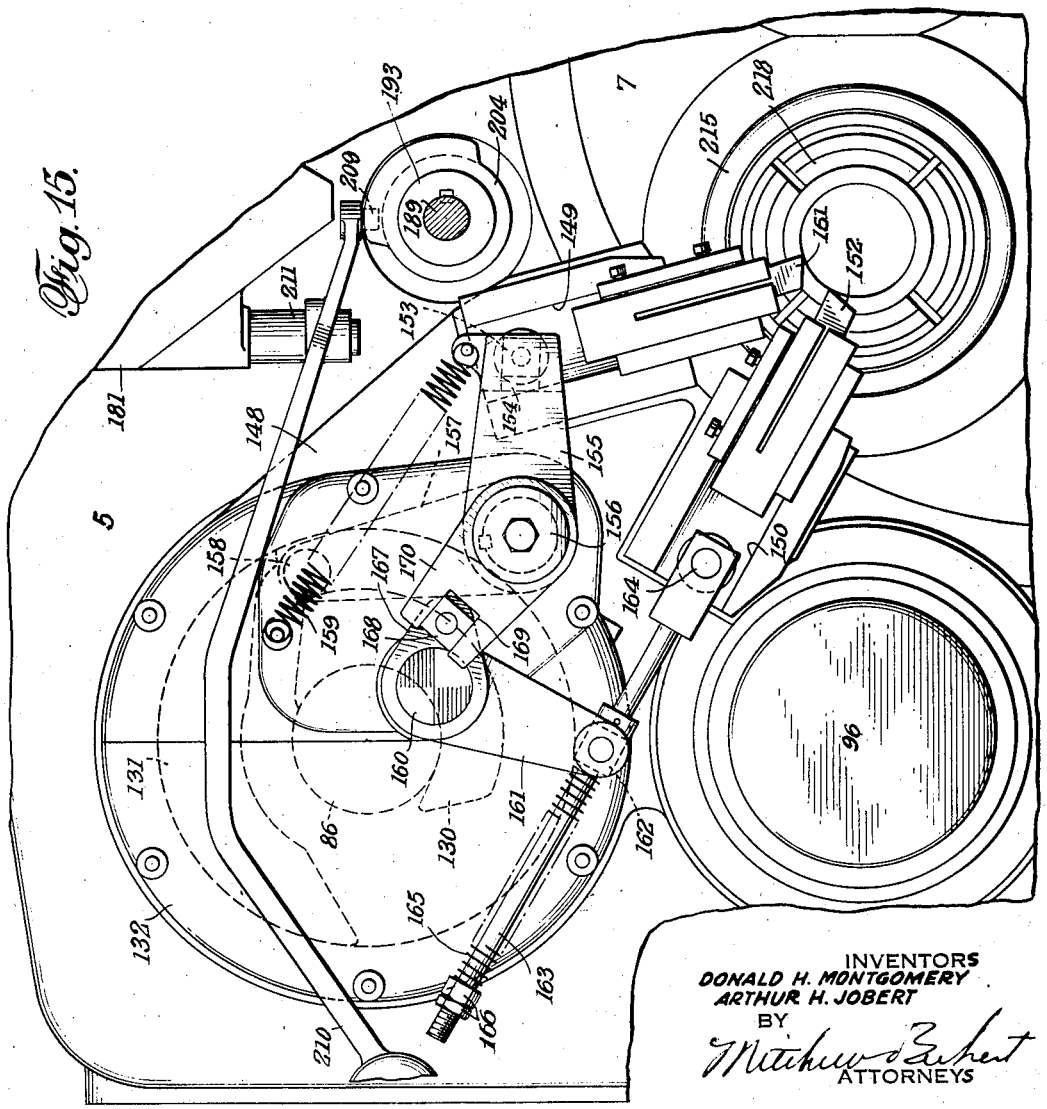
Figure 17:
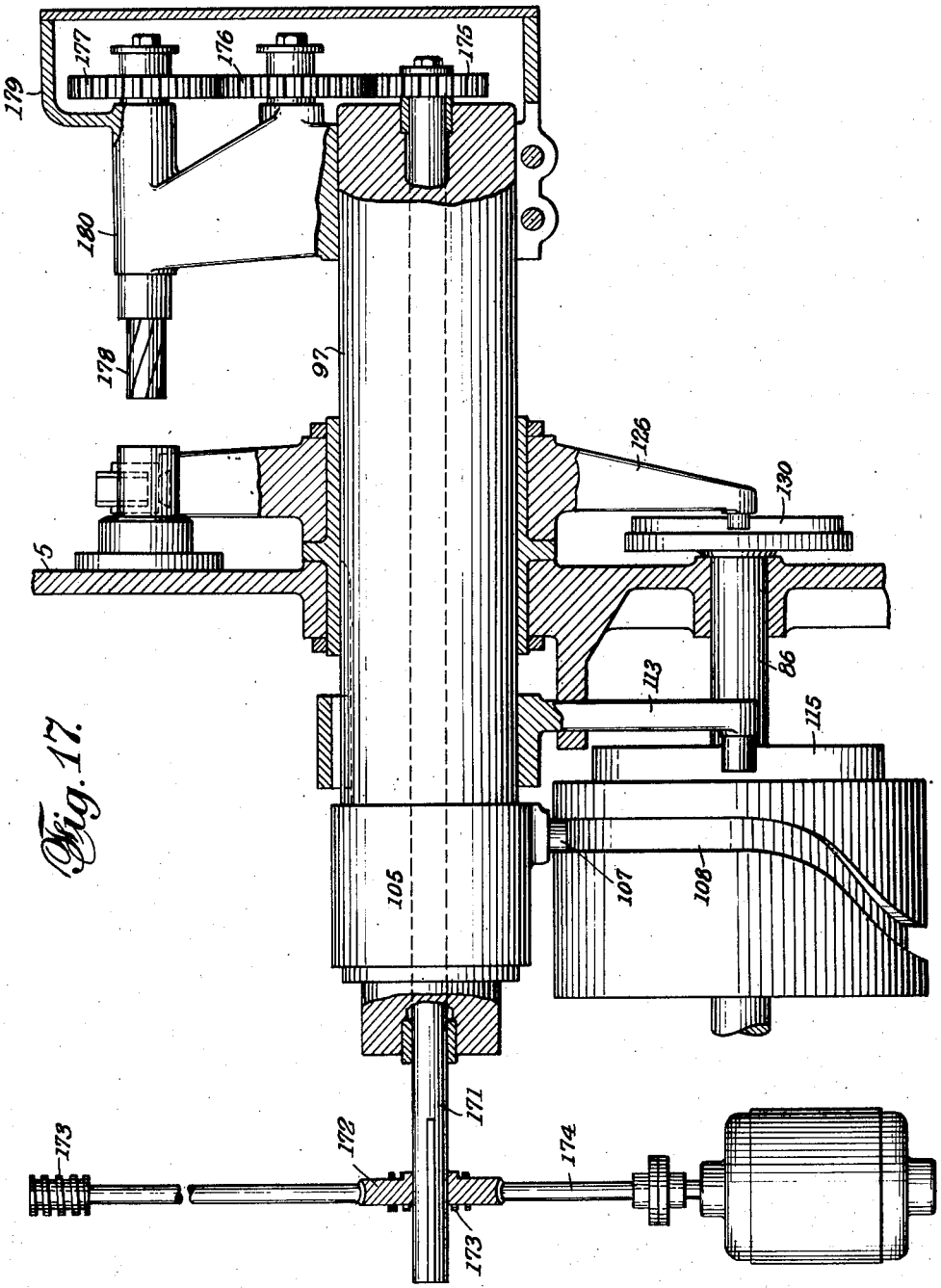

Fig. 4ª is an enlarged, fragmentary sectional view of a tool slide and associated parts;

Fig. 5 is a horizontal sectional view of the machine shown in Fig. 1 and illustrating the drive gearing;

Fig. 6 is a more or less diagrammatic view of the drive mechanism including that shown in Fig. 5;

Fig. 7 is an enlarged view in vertical section, showing tool slides or tool carriers for the upper and lower spindle positions at the left-hand side of Fig. 2 and showing various other features including guiding and feeding mechanisms;

Fig. 8 is a vertical sectional view through the parts shown in Fig. 7 and illustrating certain features in connection with chucking mechanism associated with the spindle carrier;

Fig. 9 is an enlarged view in horizontal section, illustrating features of chuck mechanism shown in Figs. 7 and 8;

Fig. 9ª is a view in side elevation of toggle mechanism for hand chuck actuation;

Fig. 10 is a view similar to Fig. 9 and is, in fact, a continuation of that figure, illustrating other features in connection with tool actuation as well as set-up or a hand cranking mechanism;

Fig. 11 is an enlarged view of a part of the frame and cam cover on the front face thereof, illustrating mechanism for tool actuation;

Fig. 12 is a view in front elevation of parts shown in Fig. 11;

Fig. 13 is a view similar to Fig. 11 but illustrating mechanism for driving a shaving tool;

Fig. 14 is a view in front elevation of parts shown in Fig. 13 and showing the shaving tool in operative position on a piece part;

Fig. 15 is a view in front elevation of a combined cut-off and back-facing mechanism;

Fig. 16 is a view in side elevation of parts shown in Fig. 15;

Fig. 17 is an enlarged sectional view illustrating an application of a rotary end working tool;

Fig. 18 is a fragmentary view of the machine in front elevation, illustrating an improved adjustable stock stop;

Fig. 19 is a view in partial vertical section substantially through the axis of the stock stop spindle illustrated in Fig. 18;

Fig. 19ᵃ is a fragmentary detail of parts shown in Fig. 19;

Fig. 20 is a central sectional view through a spindle and adjacent associated parts;

Fig. 21 is a fragmentary view in elevation of collet adjusting mechanism shown in Fig. 20;

Fig. 22 is a fragmentary view illustrating spindle driving mechanism and supporting mechanism therefor;

Fig. 23 is a fragmentary side view of compensating mechanism for a collet or other chucking means;

Fig. 24 is an enlarged fragmentary sectional view of parts of the compensating mechanism of Fig. 23 viewed at right angles thereto;

Fig. 25 is an enlarged fragmentary view in rear end elevation of the machine, illustrating stop mechanism for throwing out the feed works or stopping the machine upon a run-out of stock in the spindle and after completion of the last piece part;

Fig. 26 is a view in vertical section through the parts of the machine shown in Fig. 25;

Fig. 27 is a top plan view of parts shown in Fig. 26;

Fig. 28 is a top plan view of gearing and clutch throw-out means controlled by the stop mechanism of Fig. 25;

Fig. 29 is a view in side elevation of the mechanism shown in Fig. 28 and illustrating further gearing and throw-out mechanism associated therewith;

Fig. 30 is a sectional view showing hand-cranking or set-up mechanism, together with safety means for preventing hand-cranking during normal machine operation;

Fig. 31 is a fragmentary view in elevation further illustrating the mechanism of Fig. 30;

Fig. 31ᵃ is a sectional view of a detail; and

Fig. 32 is an enlarged fragmentary view in partial section illustrating spindle carrier locating and locking mechanism and other adjacent parts.

The machine herein disclosed, briefly stated, includes a box-like frame or casing having an indexible spindle carrier carrying spindles, so as to expose the ends of bar stock at the front of the frame. All the tools are located out in front of the frame, so as to be readily observable and accessible for adjustment. A chip pan is out in front and the chips may be readily removed. The spindle carrier is arranged to be moved out of engagement with the frame during indexing movement and the entire spindle carrier assembly is pivotally mounted on the frame on an axis at right angles to the axis of indexing. The tools are grouped about the spindles and are arranged preferably by mounting end working and forming tools concentrically, so as to save space and permit a greater number of tools to be employed or the same number of tools with greater spacing and accessibility.

There are various other features of novelty and improvement which will be hereinafter more fully described, which include mechanism for ready adjustment or removal and replacement of the collets or chucks and safety features in connection therewith. Other features involve improved chuck compensating mechanism, so arranged as to permit of ready removal and replacement. Further features involve means for convenience and safety, all looking to the provision of a sturdy, compact, relatively simple machine which will turn out piece parts at a rapid rate and of great accuracy of dimension.

*Spindle carrier*

Figure 3:
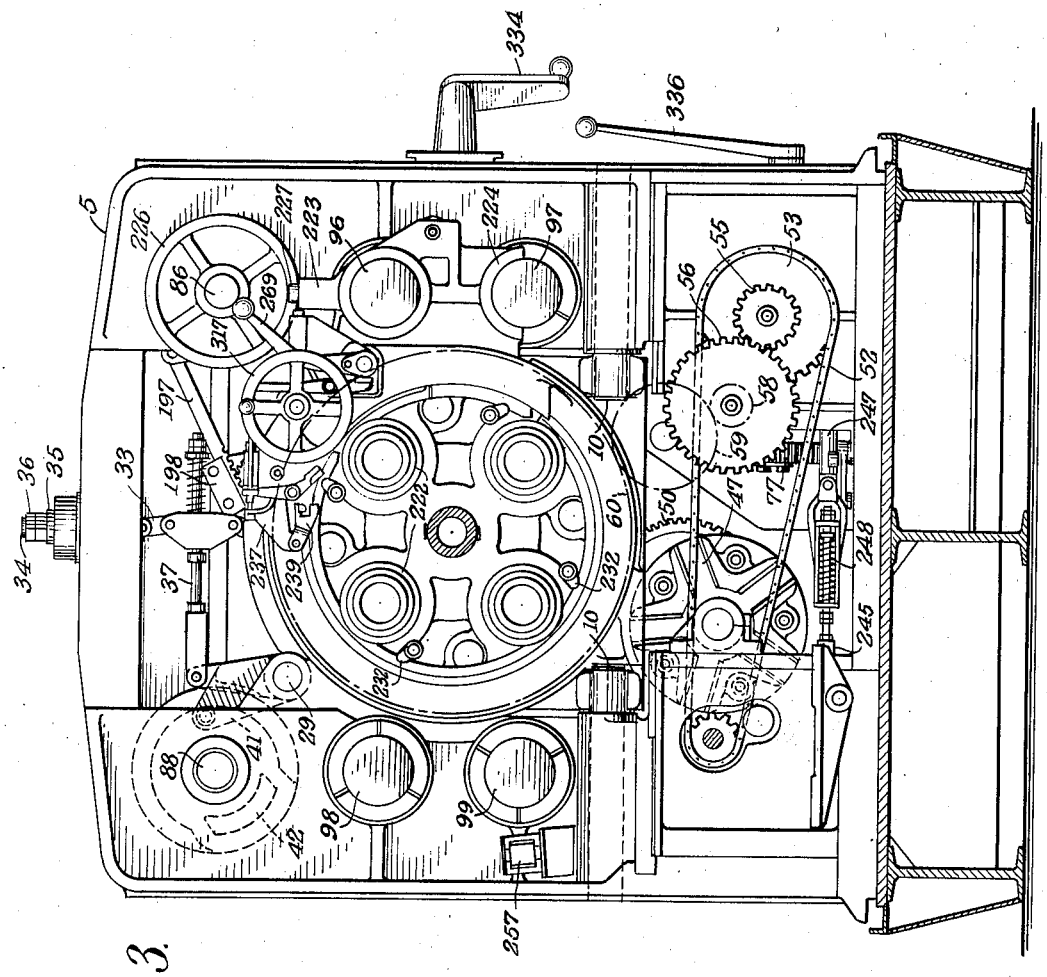
Fig. 3 is a view in rear elevation of the principal parts of the machine shown in Figs. 1 and 2, part of the frame being shown in section and certain parts being omitted for the sake of illustration.

The spindle carrier is best shown in general in Figs. 1, 4, 20 and 26. The frame 5, as heretofore indicated, is preferably of generally box-like construction, involving an upstanding front wall 6 provided with an opening for the reception of the spindle carrier 7, the front of which may be substantially flush with the front wall. The barrel-like spindle carrier between indexing movements rests near the front on a pair of frame pads 8—8 (Fig. 4) and rearwardly on two sets of similar pads 8'—8' (Fig. 1) and is supported at the rear in a thrust block 9, which is pivotally mounted on transverse stub shafts 10 (Fig. 3) on the frame. The spindle carrier at its rear face has a plurality of rearwardly extending webs or struts 11—11 and a thrust plate 12 is secured to said struts. An index gear 13 is secured to the thrust plate 12 as by means of screws 14 and the index gear has a projecting flange portion 15 interposed between the thrust plate and a ring 16 which itself is secured to the thrust block 9 as by means of pins 17. An annular plate 18 is secured as by means of screws 19 to the back of the index gear 13 and abuts the ring 16. Thus it will be seen that the index gear is rigidly secured to the spindle carrier 7 by means of the struts 11 and thrust plate 12. Furthermore, it will be clear that the spindle carrier and the index gear are rotatably secured in the thrust block 9 so that the spindle carrier and index gear may rotate relatively to the thrust block and yet the latter may serve as a fixed thrust abutment for taking thrusts of the spindle carrier as transmitted through the thrust plate 12. Furthermore, it will be clear that, since the thrust block 9 is pivotally mounted on the frame through the transverse shafts 10, the forward end of the spindle carrier 7 may be raised so as to free the same from the frame pads 8—8 during indexing and the entire spindle carrier assembly, including the thrust block, index gear, etc., will swing about the cross pivot shafts 10.

As shown more particularly in Figs. 1 and 4, the spindle carrier at its forward end is raised by means of an arcuate shoe 20, which fits the lower peripheral part of the spindle carrier. The carrier lifting shoe 20 is pivoted at 21 to a lever 22 which is itself pivotally mounted on a pivot stud 23 carried by the frame. The stud 23 is out of vertical alignment with the pivot 21 so that when the lever 22 is rocked in a counter-clockwise direction the shoe 20 and with it the spindle carrier will be elevated and the spindle carrier freed from the frame pads 8—8. During the time the spindle carrier is so freed from the frame pads it is indexed, as will be later described. The lever 22 is rocked in a counterclockwise direction, as aforesaid, to lift the spindle carrier by means of a short lever 24 carried on a shaft 25 (Figs. 4 and 5) having thereon a second lever 26 for engagement with and actuation by a cam 27 (Fig. 5) on one of the cam shafts (87) to be later referred to.

When the spindle carrier is in the position shown for example in Fig. 4, the lever 22 has been rocked clockwise so as to gently lower the spindle carrier onto the frame pads 8—8. In such position or just prior to the time the spindle carrier comes to rest on the pads 8—8, the carrier is engaged by a locating and locking means which accurately locates the spindle carrier angularly and locks the same rigidly to the frame. The specific means employed for locating and locking the spindle carrier is best shown in Figs. 1, 4 and 32. As there illustrated, we employ a locating and locking lever 28 pivotally mounted on the frame by means of a pivot stud 29. The lever 28 has a tapered nose 30 which takes into suitably formed tapered recesses in wear blocks 31 secured at proper positions on the periphery spindle carrier, as will be understood. The locking lever is actuated by a toggle. As illustrated, the toggle may comprise a toggle plate 32 and toggle links 33—33 pivotally secured thereto. One of the links is pivoted to the lever 28 preferably above the locating nose 30. The other link 33 is pivotally secured to an abutment screw 34 adjustably secured to the frame 5 by means of a threaded adjusting nut 35 rotatably held to the frame and a lock nut 36, both nuts engaging the threaded upper end of the abutment screw 34. When the toggle is straightened, the locking lever 28 is powerfully forced downwardly so as to very securely locate and lock the spindle carrier to the frame. On the other hand, when the toggle is broken, that is, when the toggle plate 32 is moved toward the left in Fig. 4, the locking lever 28 is rocked up and the nose 30 disengaged from the slot in the block 31. The toggle is actuated by means of a bar 37 which extends through the toggle plate 32 and has an adjustable spring 38 interposed between the toggle plate and adjusting nuts on the bar. An abutment collar 39 acts on the other side of the toggle plate 32. The toggle actuating bar 37 is itself actuated by means of a lever 40 pivotally secured thereto and carried by the shaft 29. The latter has an arm 41 (Fig. 3) with a cam roll for engagement with a cam 42 on one of the cam shafts (88) to be described. Thus, when the arm 40 is rocked in a clockwise direction (Fig. 4), the toggle is straightened out and such straightening action is under the influence of the spring 38, which may be tensioned as desired so as to provide the desired pressure of the spindle carrier on the frame pads. When the lever 40 is rocked in a counterclockwise direction, the toggle is positively broken by means of the abutment collar 39 on the bar 37 and the locating lever is pulled up and caused to free the spindle carrier.

The indexing mechanism for the spindle carrier is best shown in Figs. 1, 3, 5, 6 and 29. An index shaft 43 is rotated preferably by means of elliptical gears 44 from one of the cam shafts (87) to be described. The index shaft 43 has an index arm 45 and roll 46 to engage the slots 47 of a five-slot index wheel. The index wheel has secured thereto an internal gear 48 to which when the index wheel is moved drives a pinion 49 carrying with it a gear 50 meshing with the main index gear 13 on the spindle carrier, as heretofore described. It will be noted that in the machine shown there are four spindles and therefore the spindle carrier must be indexed a quarter of a revolution upon each indexing movement. A five-slot indexing wheel is employed because of the smoother action resulting and the gears 48, 49, 50 and 13 are so proportioned that one-fifth of a revolution of the index wheel will move the index gear 13 and consequently the spindle carrier through one-quarter of a revolution, as will be understood.

*Spindle and cam drives*

The present machine employs four main cam shafts, one for each spindle position, and drives for the cam shafts and spindles will now be described. The drives are best shown in Figs. 5, 6 and 22. A motor 51, mounted on the frame, through a sprocket and chain 52 drives a sprocket 53 on shaft 54. Shaft 54 at the outside rear of the machine carries a change gear 55 which meshes with a second change gear 56 on the main spindle drive shaft 57. The spindle drive shaft carries a drive pinion 58 which meshes with an idler gear 59, which in turn meshes with the external teeth of a ring gear 60 surrounding the spindles. Each spindle carries a spindle gear 61 meshing with the internal teeth of the ring gear 60, as shown more particularly in Fig. 22.

It may be here stated that the ring gear is supported on the spindle carrier by means in addition to the spindle gears 61, as shown best in Figs. 20 and 22. The ring gear 60 has a supporting ring 62 secured to its side and the internal diameter of the supporting ring 62 is the same as the pitch diameter of the internal gear 60. Each spindle carries a sleeve or collar 63 fixed thereon and contacting with the internal surface on the supporting gear 62. A flange 64 on each of the sleeves 63 fixed on the spindles serves to hold the assembly in place. It will be seen that when the ring gear 60 is rotated in order to drive the spindles the ring gear will be supported by means of the supporting ring 62 and the sleeve 63 on the spindles, and since the internal circumference of the supporting ring 62 follows the pitch line of the internal teeth of the ring gear 60, the supporting ring 62 will roll and not slip on the rotating sleeves 63. Furthermore, between the spindles, the supporting ring 62 and consequently the ring gear 60 may be further supported by means of rollers or anti-friction bearings 65—65 mounted on the studs (282) carrying the chucking forks, to be later described. Thus, the ring gear 60 will be adequately supported at all times, even independently of the spindles, and is capable of high speed rotation. The spindle speeds may of course be readily varied by substituting other change gears for the gears 55—56 shown in Fig. 6.

The cam shafts are driven by means of a shaft 66, which is driven at different speeds, as will be described. The shaft 54 drives a shaft 67 through a clutch 68. The shaft 67 through bevel gears 69 drives one part of the main feed clutch 70 and shaft 66. Such is the high speed or accelerated drive of the shaft 66 and that drive is active only when the clutch 68 is engaged. The slow speed drive for the shaft 66 is through the shaft 57, worm 71, and worm wheel 72 to shaft 73. Shaft 73 carries a change gear 74 meshing with another change gear 75. Gear 75 drives one part of the main feed clutch 70 through an overrunning clutch 76 when the high speed clutch 68 has been disengaged. When the high speed clutch 68 is engaged, the drive is through the two bevel gears 69 and the shaft 66 is driven at high speed, such high speed being permitted by the overrunning clutch 76, as will be clear. Of course when the main clutch 70 is disengaged, the shaft 66 is stopped, regardless of the condition of the clutch 68.

The shaft 66, through gearing 77—78—79, drives a cross shaft 80. The cross shaft at opposite ends carries bevel gears 81—81. At opposite sides of the machine are a pair of vertically mounted shafts 82—83 having bevel gears 84—84 meshing with and driven by the bevel gears 81—81. Two cam shafts 85—86 are mounted longitudinally of the spindle carrier at one side thereof and a second pair of similarly located cam shafts 87—88 are mounted at the opposite sides of the spindle carrier, as shown particularly in Fig. 4. The vertical shaft 82 carries a lower worm 89 (Figs. 4, 8), meshing with a worm gear on the cam drum 90 and an upper worm 91 meshing with a worm gear on the upper cam drum 92. The vertical shaft 83 carries a lower worm 84 meshing with a worm gear on the lower cam drum 93 and an upper worm 94 meshing with a worm gear on the upper cam drum 95. Thus, the four cams 90, 92, 93 and 95 are all driven in unison and the slow or working speeds of those drums may be varied by the change gears 74—75 (Figs. 5, 6). The high or accelerated speed of the cam drums always remains the speed fixed by the motor sprocket and the sprocket 53. The cam shafts 85, 86, 87 and 88 actuate all of the feed mechanism of the machine.

Tool carriers

The machine in the preferred form is provided with a plurality of tool carriers for each spindle position. Tool slides in the form of heavy bars 96—97—98—99 (Figs. 3, 4, 7, 8, 17) are mounted in bearings in the frame 5, so as to be very rigidly supported for sliding and rotary movement therein. Since all of the tool slide bars may be substantial duplicates of each other and be similarly mounted, a description of one will suffice for all.

As shown particularly in Fig. 7, each tool slide bar is mounted in a rear taper bearing 100, which may be taken up to adjust the fit and to compensate for wear, as will be understood. The front bearing preferably includes a long sleeve 101, rigidly secured to the upstanding front wall of the frame and extending rearwardly in a bore in the frame and forwardly beyond the front face of the frame wall. Taper take-up bearings 102 are provided in each sleeve 101, so as to adjust the fit of the tool slide in the front bearing, and to compensate for wear.

Each tool slide is preferably arranged to be moved both axially and angularly. As shown also particularly in Fig. 7, each tool slide carries a heavy drive collar 103, rigidly secured against endwise movement thereon and may be mounted between a shoulder and a fixed collar 104. The drive collar 103 is rotatable relatively to the tool slide so as to permit angular movement of the latter when required. Each collar 103 has a guide projection 105 thereon, extending between and slidably guided by the guide surfaces 106, one on the frame 5 of the machine and the other on a frame bracket 106' doweled and bolted thereto, as shown in Figs. 9 and 10. Each guide projection 105 carries a cam roller 107, which is positioned to be driven by a cam 108 on the cam drums 90—92—93—95. Therefore, upon rotation of the four cam shafts heretofore noted the four tool slides will be reciprocated in accordance with the characteristics of the feed cams 108.

When one or more of the four tool slides are to have only axial movement, such slide or slides are arranged to be guided against all angular movement. In the preferred form such guiding means is associated with or incorporated in the means which may, when desired, be employed for imparting angular movement to the tool slides. The slides shown are provided with means for angularly moving the same. As shown, each tool slide is provided with a keyway 109 and with a collar 110 (see also Fig. 4ᵃ), carrying a key slidably fitting the keyway 109 at one side. A second locating key and keyways are provided in the opposite side of the slide as shown in Fig. 4. Each collar 110 has a guide lug 111 (Fig. 10) fitting in a notch or slot 112 in the frame 5, adjacent the guide surfaces 106, so that the sleeves 110 will be guided rotatably and held against longitudinal movement relatively to the frame. An adjustable limit stop 111' may be provided in a plate bolted to the bracket 106' and positioned to be engaged by a button on the lug 111, as shown in Fig. 10, to limit angular motion in one direction. Axial movement of the tool slides through the sleeves 110 is, of course, permitted by means of the splined connection between the tool slides and the sleeve 110. Each sleeve 110 has an arm 113 thereon, carrying a cam roll 114, to be actuated by a face cam 115, carried by the main cam drums hereinbefore mentioned.

It will thus be seen that each tool slide may be reciprocated to carry its tool in and out and may also be rocked or swung to carry the tool thereon radially inwardly and outwardly relatively to the work.

Each sleeve 110 may be very accurately guided relatively to its tool slide by means of an adjustable screw (Fig. 4ᵃ), engaging with the key, as will be understood. Opposite the adjustable keys we have provided fixed keys, to act as fixed locating means, as will be clear from the disclosure of Fig. 4.

When it is desired to hold any one or all of the tool slides against any angular movement, each arm 113 may be drawn up against a frame part 117 by means of a rod 118 (Fig. 4ᵃ), pivoted to the arm 113 and carrying nuts 119 and a bushing 120 interposed between the washers 121, as will be clear. A spring 122 will act on the rod 118 at all times, so as to urge the arm 113 in a clockwise direction as viewed in Fig. 4ᵃ and the cam roller against the cam. When the nuts 119 are backed off, the arm 113 may be swung by means of the face cams heretofore mentioned, so as to swing the tool slides. When the nuts 119 are properly adjusted the bushing 120 may serve as a suitable stop by reason of the left-hand washer 121 engaging the end thereof and driving the same into the right-hand washer, so as to prevent further tool movement and therefore serve as a tool stop. All of the arms 113 may be equipped with similar devices, as shown in Fig. 4ᵃ. Some of them, for instance, the top arms 113 shown in Fig. 4, may be provided with screws 123, similar to set screws, and locked in place for holding the upper arms 113 against rotation when that is desired. Obviously when the tool slides are locked against rotation, the face cams normally employed for swinging the arms should be removed from the drums.

In addition to the tool slides 96—97—98—99, which are adapted for end working tools in that they may have a reciprocating motion and are also adapted for forming tools in that they may have angular motion, we have provided forming tool arms adapted only for angular swinging motion. Such forming tool arms may be provided for each spindle position and in order to save space and provide for a more compact arrangement we mount the forming tool arms concentrically with the tool slides 96—97—98—99. As shown particularly in Figs. 2, 7, 13 and 14, each sleeve 101 extending outwardly from and rigidly secured to the upstanding frame wall constitutes a bearing for a bearing sleeve 125 of a swinging or forming tool arm 126. Each bearing sleeve 125 is preferably split, as indicated at 127, and taken up with screws, as will be understood, in order to adjust the fit and compensate for wear. A nut 128 serves to position the forming tool sleeve 125 on the bushing 101 against the flange fitting against the frame. The forming tool arms may be urged away from the work and the cam rolls into engagement with their cams, as by means of spring 129, connecting the arms at the outer sides of the sleeves, as will be clear from Fig. 2.

The forming tool arms are fed by cams which, in the preferred form, are mounted on the four cam shafts at the front side of the upstanding front wall. As shown (Figs. 11, 13), the cam shafts 85—86—87—88 extend through the front wall and are provided with cams, as 130, on cam disks 131 carried at the forward ends of the cam shafts. These cam disks and cams, being at the outside of the frame, are protected by housings 132, secured to the machine frame. The cams, as 130, actuate the various forming tool slides. As shown particularly in Figs. 2, 7, 11 and 12, each forming tool support or arm 126 carries means to be actuated by a cam 130. As illustrated, the arm 126 is provided with a T-slot 133 and a cam roll block 134, carrying a cam roll 135, and is adjustably carried by and held in said slot 133. A part of the block 134 extends through an opening in the cam housing cover 132 and may carry a sealing plate 136, slidable with the arm 126, so as to protect the cams against the ingress of chips and other foreign matter.

In the particular machine illustrated in the drawings, forming tools are carried by the forming arms 126 only in the two lower spindle positions. The upper right-hand spindle position of Fig. 2 carries a shaving tool which in a sense is also a forming tool, shown more particularly in Figs. 2, 13 and 14. The shaving tool comprises a yoke member 137, carrying an adjustable roller 138 for engagement with one side of the work piece 139 and carrying a shaving tool 140 at the opposite side of the yoke, so that the yoke straddles the work and the roller 138 maintains the shaving tool in cutting position in relation to the work. The shaving tool holder is pivoted to a bracket 141 at 142 and the bracket is secured to the forming tool arm 126, so that when the latter is oscillated the shaving tool is fed up to and retracted from the work, as will be understood. The forming arm 126, actuating the shaving tool, is given considerably more oscillating motion than the arm shown in Figs. 11 and 12. As illustrated in Figs. 13 and 14, the cam 130 actuates a cam roll 135, carried on an arm 143, secured to a short pivot shaft 144, journaled in a bearing in the housing cover 132. The shaft 144 at the outside carries an arm 145, which is coupled to the forming arm 126, as by means of a pin and slot connection, specifically shown as embodying a slide block 146 carried by the arm 126 and slidable in a slot 147 in the lever arm 145. Thus, depending upon the particular lever lengths, the forming arm 126 carrying the shaving tool may be given considerably more oscillating movement than when the same is directly actuated by the cam. It will be clear that the increased oscillating movement of the shaving tool is necessary in order to cause the tool to clear the work and again bring the same up to cutting position.

In the upper left-hand spindle position as shown in Fig. 2, the tool arrangement corresponding to the forming tools in other positions may be embodied in a combined cut-off and back-facing tool means, serving to cut off the finished piece part and simultaneously back face the same.

As shown in Figs. 2, 15 and 16, the frame carries a bracket 148, having a pair of slideways 149—150. The slideway 149 carries a cut-off slide bearing a cut-off tool 151, while the slideway 150 carries a back-facing slide bearing a back-facing tool 152. The cut-off tool slide in the form shown carries a slide block 153, movable in a slot 154 in a lever arm 155. The lever 155 is carried by a shaft 156, journaled in the cover housing 132 and carries at the inner side of the housing cover a cam lever 157, having a cam roll 158 to be actuated by the cam 130 within the housing cover, for reciprocating the cut-off tool slide 151. A spring 159 serves to always tend to retract the cut-off tool. The back-facing tool 152, as will be described, is actuated by and in synchronism with the actuating mechanism for the cut-off tool slide. As illustrated, the housing 132 carries a pivot shaft 160, having a lever arm 161 pivotally mounted thereon or thereby and the lever arm 161 is connected by means of a rotatably mounted block 162 to an actuating rod 163, pivotally mounted at 164 on the back-facing tool slide. A spring 165 and nuts 166 serve to hold the back-facing tool slide up in position and cause the same to be retracted when the lever 161 is retracted. Mounted on the pivot shaft 160 or at least movable as a unit with the lever 161 is a second lever 167, carrying a rotatably mounted block 168 fitting within a slot 169 in a lever 170, carried by the shaft 156, so that the levers 155—170 move as a unit.

It will be seen that, when the cam 130 actuates the cut-off tool slide, the lever 170 acting through the block 168 will rock the lever 161 and actuate the tool slide carrying the back-facing tool 152. With the particular lever design herein disclosed the back-facing tool is given considerably greater movement than the cut-off tool slide. The tool slides are so adjusted in practice that the cut-off tool and back-facing tool will at some time be acting upon the work at the same time. The back-facing tool, however, since it moves much faster, does not start its operation until the cut-off tool has almost completed its function. Generally, the back-facing tool and the cut-off tool are intended to complete their respective operations simultaneously but, if desired, the back-facing tool may be set ahead slightly so that the very last of the cutting off operation is performed by the back-facing tool and a better back faced piece part produced.

We have also made provision for rotating end working tools which may be applied in one or all spindle positions. As shown in Fig. 17, the tool slide 97 is provided with a central bore for receiving a rotary drive shaft 171, which may be driven by a worm wheel 172 splined thereto, the worm wheel being driven by a worm 173 on a motor or other drive shaft 174. Clearly, the shaft 174 may be provided with another worm 173 for driving a similar tool in another spindle position. The shaft 171 extends through the tool slide 97 and at the forward end is provided with a gear 175 which, through an idler 176 or other intermediate gearing, drives a gear 177 on the shaft carrying a tool 178, which may be a high speed drill, reamer or other type of rotary end working tool. The gear mechanism 175—176—177 may be enclosed in a housing 179, forming a part of or secured to the detachable bracket 180 carried on the tool slide 97 and which, as will be clear, carries the shaft for the end working tool 178. It will be clear that the rotary end working tool 178 may be moved in and out and may also be rocked or swung with and by the tool slide 97, as heretofore described. Various speeds may be obtained by replacing the gears 175—176—177 or some of them with other change gears.

Stock stop

The stock stop disclosed particularly in Figs. 2, 18 and 19 is in many respects the same or similar to that disclosed in Montgomery et al. application, Serial No. 40,074, filed September 11, 1935. The frame at the region above the spindle in feed station has a bracket 181 secured thereto. The bracket is provided with a longitudinally extending T-slot 182 and a stock stop housing 183 is adjustably held on the bracket by the usual T-bolts 184 having heads 185. Projecting in a generally downward direction from the stock stop housing is a stock stop member or finger 186 provided with rack teeth 187 actuated by a pinion 188 on a shaft 189 supported by the housing 183. A coil spring 190 urges the pinion 188 in a direction to project the stock stop member 186. The stock stop 186 when in projected position, as indicated in Figs. 18 and 19, extends downwardly at an angle and the slabbed off radial surface 191 is positioned in the path of the bar stock and acts as the stop, as will be understood. The shaft 189 is oscillated by means to be now described. The shaft 189 is connected by means of a spline 192 to a sleeve 193, which by means of a slot connection 194 permitting limited relative rotation, is connected to a sleeve 195. The sleeve 195 has a pinion 196 which is engaged by a rack 197 held in engagement therewith by means of a strap device 198 secured over the sleeve 195 and serving to hold the rack in engagement with the pinion. The rack 197 is pivotally connected at 199 to a lever 200 pivotally connected to the frame by means of a shaft 201. Connected to the shaft or connected to the lever 200 so as to be movable as a unit therewith is a second lever carrying a cam roll 202 which is actuated by a cam 203 on cam shaft 86 (Fig. 7). When the cam shaft 86 rotates, the cam 203 serves to reciprocate the rack 197 and through the pinion 196, the sleeves 195, 193, and shaft 189 project and retract the stock stop 186, as will be understood. In order to operate the stock stop by hand so as to retract the latter, even though the cam is in position to project the same, we have provided a rotatable connection between the shaft 189 and its driving sleeve 195. In the form shown there is a spool sleeve 204 which carries a pin 205 passing through an angular slot 207 in the sleeve 193 and extends into a longitudinally extending slot 206 in sleeve 195. The sleeve 204 has a spool groove 208 therein for the reception of a roller 209 carried by a hand lever 210 pivoted to the frame at 211. Thus, when the hand lever 210 is actuated, the pin 205 following the longitudinally extending slot 206 through the angular slot 207 rotates the sleeve 193 and with it the shaft 189 so as to rotate the pinion 188 for retracting the stock stop 186. Therefore, when it becomes necessary to remove the butt end of stock from the spindle in feed station, the stock stop may be very readily retracted upwardly even though the cam has projected the same into stock stopping position.

Since the bar stock may strike the stock stop with considerable force, I prefer to provide means in the form of a bolt or tie bar 212 secured to the frame and extending through a lug 213 on the stock stop housing. Nuts 214 serve to act as stops and prevent the stock stop from jolting into a position of maladjustment. Furthermore, the nuts 214 may serve as adjusting means to move the stock stop housing into very finely adjusted position.

Stock feed

Each of the spindles 215 are rotatably carried by the spindle carrier on a preloaded front bearing 216 (Fig. 20) and preloaded rear bearings 217. There is a collet 218 keyed, as illustrated, in the nose of each spindle and a stock feed tube 219 is positioned inside of the chucking tube 220 in the spindle. The feed tube has the usual feed fingers 221 for frictionally gripping the bar stock.

Now, referring particularly to Figs. 7, 25 to 29, it will be seen that each feed tube at the rear has the usual spool 222. A stock feed slide 223 is slidably mounted upon the tool slide 96 (Fig. 7) and has a saddle member 224 slidable on the tool slide 97 so as to guide the stock feed slide in its stock feeding movements. The stock feed slide is fed forwardly to project the stock by means of a spring 225 secured thereto and to a part of the frame. The upper cam shaft 86 carries a stock feed cam 226 and the stock feed slide has a cam roll 227 to engage the cam. It will of course be understood that the stock feed slide is positively retracted by the cam 226 and is fed forwardly to feed the stock by means of the spring 225 as the cam rotates so as to permit such feeding movement. The stock feed slide 223 (Fig. 25) has a feed shoe 228 normally engageable with the spool 222. During the normal operation the stock is fed out step by step and until the bar becomes exhausted.

We have provided improved means for stopping the machine or the feed works thereof when the bar stock has become exhausted and the particular embodiment illustrated herein is a modification and in some respects an improvement on the mechanism disclosed in Montgomery et al. application, Serial No. 46,662, filed October 25, 1935. The rear end of the spindle carrier adjacent each spindle carries a guide rod 229 projecting rearwardly and serving to slidably support a sleeve 230 having an actuating lug 231 projecting therefrom at one point thereon and a second lug 232 at the rear of the sleeve. A suitable detent, such as a spring pressed ball or the like 233, serves to hold the sleeve 230 on its guide rod 292 in either of its extreme positions. The positions of the lugs 231—232, illustrated in Fig. 26, are the normal positions when the machine is operating and before the bar stock has become exhausted. During normal operation the bar stock engages the stock stop long before the feed roller 227 gets to the bottom of the feed cam 226 and in fact during normal operation the roller 227 never reaches the bottom of the cam 226. However, when the bar of stock is exhausted to the extent that only sufficient stock is left to make one more piece part, the feed fingers slide off the rear end of the stock on the draw back of the feed tube and upon the next feed movement of the feed tube the latter abuts the rear end of the stock bar and the spring 225 draws the feed slide toward the right as viewed in Fig. 7, and toward the left as viewed in Fig. 26 farther than normal in order to cause the stock to engage the stop. During such movement a part of the stock feed slide, namely, a finger 234 (Fig. 27) thereon, engages the forward lug 231 and moves the sleeve 230 and with it the rear lug 232 forwardly, that is, toward the left in Fig. 26, so as to position the lug 232 in the dot-dash line position of Fig. 26. The lug 323 in that forward position is set to trip mechanism for throwing out the feed works.

In the form illustrated some part of the frame or guard ring 235 carries a bracket 236 upon which a lever 237 is pivoted at 237'. The lever has pivoted thereto at the point 238 a trigger or latch link 239 having an abutment shoulder 240 engageable with a pin 241 on the bracket so as to hold the lever 237 up in the position shown in Fig. 25. The lever 237 carries a part to engage and maintain closed a switch 242 which controls a solenoid, the purpose of which will be later described. Now, when the bar stock has become exhausted and the lug 232 of the spindle in which the bar stock is exhausted has been moved to the dot-dash line position of Fig. 26, it will wipe the link 239 and raise the same so as to free the abutment 240 from the pin 241 and thus permit the link 237 to drop to a sufficient extent to open the switch 242 to deenergize the solenoid which controls the feed works of the machine. It may be observed at this point that the abutment member 232 is shifted to trigger tripping position in the feed station but the trigger mechanism including the trigger link 239 will not be engaged by the abutment 232 until the spindle with the exhausted bar has indexed completely around and the last piece part completed.

The mechanism for throwing the feed clutch in response to the stop mechanism of Fig. 25 just described is best illustrated in Figs. 28 and 29. The cam shaft 87 which drives the indexing mechanism heretofore described or the elliptical index gear carries an adjustably mounted cam 243 for the purpose of tripping the main feed clutch mechanism at the proper point in the cycle of the machine, that is, when the spindle with the exhausted bar has again reached the feed station and the chuck has been opened and the feed slide fed forward. A bracket 244 on the frame slidably supports a rod 245 having connection through nuts 246 with a part connected to the clutch rod 247 which serves to throw the main feed clutch 70 (Figs. 5, 6). The bracket 244 pivotally carries a lever 249 having connection with a lever 250 also pivotally carried by the bracket and which engages a suitable abutment on the rod 245 for throwing the main feed clutch. Another lever 251 carrying a cam roll 253 for engagement by cam 243 is also pivotally carried by the bracket 244. A lever 252 is pivotally mounted directly on the lever 251. The free end of the lever 252 is urged downwardly, that is, so as to tend to rotate it in a clockwise direction by means of a spring 254 and is normally held in raised position against the tension of the spring 254 by a rod 255 connected to the core 256 of solenoid 257. Thus, when the circuit to the solenoid is broken, the core drops down, permitting the lever 252 to swing substantially to the position shown in Fig. 29 so as to position the abutment 258 over the abutment 259 on lever 249. The two levers 249 and 252 are therefore in effect coupled together and the cam 243 at the proper point in the cycle of the machine engaging the cam roll 253 rocks the lever 249 so as to move the arm 250 and through the rod 245 throw the main clutch 70, as heretofore noted. It will be clear that during normal operation with the solenoid 257 energized the abutment 258 will be held out of coacting relationship with the abutment 259 and the cam roll lever 253 will be rocked during each cycle of the machine without affecting the levers 249—250. To repeat, when a bar of stock is exhausted in any spindle, the feed movement of the feed slide moves the bar up to the stock stop to provide stock for the last piece part and during such movement the abutment 232 (Fig. 25) is moved to tripping position. That spindle then indexes completely around so as to finish the last piece part and the last of the indexing movement causes the abutment 232 to trip the latch link 239 and deenergize the solenoid 257. The machine continues to operate until the last piece part is cut off, the chuck opened, and the feed slide fed partly forward. At that time the main feed clutch 70 is disengaged and the feed works stopped. The butt end of stock is removed and a new bar then inserted in the spindle.

After a fresh bar has been inserted the tripping abutment member 232 is again moved to its normal or full line position shown in Fig. 26 by means to be now described. The bracket 236 carries a lever 260 pivoted thereto at 261 and engageable through a pin and slot connection 262 with a block actuated by means of a bar 263 which may be hand actuated as will be later described. The lever 260 has a chamfered or cam face 264 which when the lever 260 is rocked in a clockwise direction engages the rear tripping abutment 232 and shifts the same back to the full line position of Fig. 26, as will be understood.

After the feed clutch has been automatically thrown out upon a run-out of stock, the spindles will still be in rotation and a new bar of stock should not be inserted with the spindles in rotation. We have therefore provided means for stopping the spindle rotation and simultaneously putting the parts in position to facilitate bumping a new bar of stock in the spindle, which means will now be described. The feed shoe 228 (Fig. 25) is pivoted to a part of the feed slide and is provided with a slot 265 which is engaged by a pin 266 carried on a lever 267 on shaft 268. The shaft 268 carries a handle 269 and when the handle 269 is manually rocked in a clockwise direction as viewed in Fig. 25, the pin 266 riding in the slot 265 withdraws the feed shoe from the spool on the rear end of the feed tube. The feed tube is then loose in the spindle and a new bar of stock may be readily bumped through the feed fingers, the feed spool in the meantime engaging the return shoe 270 on the feed slide, as will be understood. Rotation of the lever 269 so as to disengage the feed shoe from the feed spool serves to simultaneously stop the spindle rotation and through rod 263 resets the sleeve 230 and its associated abutments 231, 232 to their original running positions. One means for accomplishing that result may constitute a lever 271 pivoted to the bracket at 272. A part of the lever 269 has a cam surface 273 which engages the lower end of the lever 271 and rocks the same in a clockwise direction. The lever 271 carries a spring pressed pin 274 which is positioned to engage a part of an electric switch 275 in the main line of the machine and when the switch 275 is opened by clockwise rocking of the lever 271, the motor is stopped and the spindle rotation ceases. When the spindles stop as heretofore noted, a new bar of stock is bumped into place and the handle 269 manually rocked in counterclockwise direction, which rocking causes the switch 275 to again be closed. By such rotation of the handle 269 the feed shoe reengages the feed spool. The motor switch if thrown out by the switch 275 may again be closed, the feed works thrown in, and the automatic operation of the machine continued until another bar of stock runs out.

*Chucking mechanism (See Figs. 7, 8, 9, 10, and 20)*

Each spindle, as heretofore noted, is provided with a chuck and the chucks in feed station are automatically actuated by means of a chucking slide 276, which may be slidably mounted on the same tool slide 96 which slidably carries the feed slide 225. The chucking slide 276 has a cam roll 277 fitting the cam groove in feed cam 278 mounted on the cam shaft 86 which, as heretofore stated, also carries the feed cam 226. The chucking slide 276 has the arm carrying the cam roller 277 guided between the guide surfaces 106 on the frame. While the groove in the chucking cam 278 as shown is of uniform width, it may be here stated that there is a longitudinal enlargement therein at one point to permit the chuck to be manually actuated by movement of the chucking slide when a spindle is in feed station. The chucking slide 276 has a chucking arm provided with a groove 279 which straddles a tongue 280 on a chucking fork 281 slidably mounted on a pin 282 carried by the spindle carrier; and it may be noted that these guide pins 282 are the same pins which carry the anti-friction supporting bearings for the spindle ring gear, as illustrated particularly in Fig. 22. The chucking fork 281 engages a chucking spool to be later described, and when the chucking slide is actuated the fork 281 serves to chuck and unchuck the stock.

Since the chucking forks 281 index into engagement and out of engagement with the chucking slide in the work stations, the chucking forks are therefore not supported by the chucking slide and we have provided means for latching the chucking forks 281 in the chucked up position into which they are moved by the chucking slide 96 before the chucking forks index out of engagement therewith. Each chucking fork carries a latch 283 pivotally mounted thereon at 284 and spring pressed by means of a compression spring 285 (Fig. 8). The tie bars or struts extending rearwardly from the spindle carrier are provided with shoulders or latch keeper abutments 286 behind which the forward ends of the latches 283 engage before the chucking forks 281 are disengaged from the chucking slide. It will be seen that the tail end of the latch 284 remains free of the shoe 279 until after the tongue 280 on the chucking fork is in engagement with the groove of the chucking slide and when the tail end of the latch does reach the groove in the slide, the nose end of the latch is cammed out from behind the latch shoulder 286 and is held in that position as shown in Fig. 8. It will also be clear that before the tongue 280 leaves the slot in the slide 279, the tail end of the latch will already have left such slot and the compression spring 285 will force the nose of the latch behind the abutment shoulder or latch keeper 286 so that the chucking fork will be definitely latched in chucked up position in all work stations, as shown also particularly in Fig. 8.

At times it becomes necessary and is usually desirable for testing the chuck to operate the same by hand, and we have provided means to permit ready manipulation of the chucking slide by hand. As shown particularly in Figs. 9—9ª, the frame carries a rotatably mounted shaft 287 having the squared end 288 for engagement by a hand lever or wrench 289 for manual chuck actuation. The shaft 288 has a toggle link 290 fixed thereon and pivoted by means of a toggle pin 291 to a second toggle link 292. The link 292 is pivotally mounted about a pin 293 fixed to the chucking slide 276. It will be seen that the links 290—292 have mutually abutting shoulders 294 to prevent a complete straightening of the toggle. Therefore, the chucking cam may at all times break the toggle during normal automatic chucking operations. When the hand lever or wrench 289 is applied to straighten out the toggle, as shown in Fig. 9ª, the chucking slide is moved to chuck the work. In order to compensate for wear and to adjust the toggle and to adjust the chucking slide 276 so that its slot 279 will be in proper position to collect the tongue 280 on the chucking fork, there is an eccentric bearing bushing 295 surrounding the pin 293, which bushing may be turned and held in adjusted position by means of a set screw 296 and the toggle link axis thereby adjusted. As heretofore stated, the groove in the chucking cam 278 is enlarged at one point so that the chucking slide may be moved relatively to the cam for manual chuck operation.

While the chucking means may take various forms, we have disclosed a collet actuator broadly like that disclosed in Montgomery application, Serial No. 89,871, filed July 10, 1936. There is a sleeve 297 (Fig. 20) keyed at 298 to the spindle 215. The sleeve carries an abutment ring 299 and wedge members in the form of balls 300 are interposed between relatively inclined abutment surfaces on the ring 299 and the sleeve 297. The sleeve 297 slidably carries a chucking sleeve 301 having a bell mouth to cam the balls 300 inwardly for forcing the abutment 299 rearwardly for drawing the collet tube rearwardly and chucking up the bar stock. The chucking sleeve 301 has the usual spool or circumferential groove 302 for the reception of the chucking fork 281, as will be understood.

Between the abutment 299 and a second abutment member or nut 303 on the collet tube 220 is interposed an improved compensating mechanism designated generally 304 to provide compensation for bar stock varying somewhat in size. The abutment nut 303 is screw threaded to the end of the collet tube and a lock nut 305 is also screw threaded on the collet tube and serves to lock up the abutment 303. As shown in the drawings, the nut 305 has a flange 306 overstanding a part of the abutment nut 303. The sleeve 306 is provided with a slot 307 following the pitch of the thread on the collet tube and the abutment nut 303 carries a pin 308 fitting within the slot 307 for a purpose which will be described.

Each of the nuts 303—305 are provided peripherally with gear teeth 309—310 for the purpose of rotating the nuts by gear means which may be actuated from a conveniently located accessible remote point for collect adjustment or removal and replacement. As shown more particularly in Figs. 1, 20, 26 and 27, there is a bracket 311 carried by a shaft 314 rotatably mounted in the thrust housing 9 at the rear of the spindle carrier. A pin 312 having three spaced apart grooves to be engaged by a spring pressed pin or plunger 313 for holding the bracket in one of the two positions corresponding to the grooves serves to support the bracket 311. The bracket 311 has a bearing for the shaft 314 mounted in the thrust bracket and the shaft also acts as a support. The shaft 314 carries a pinion 315 meshing with a gear 316 carried on a stub shaft on the bracket 311. The gear 316 during normal operation of the machine is positioned between the gears 309—310, as shown more particularly in Fig. 20. The shaft 314 extends rearwardly and is provided with a manual crank or handle 317 located in a conveniently accessible position.

When the handle 317 is drawn rearwardly, the gear 316 meshes with the gear 310 on the lock nut 305. Rotation of the handle 317 in proper direction will cause the lock nut 305 to be unscrewed so as to unlock the nut 303 and sufficient rotation of the handle 317 will cause the pin 308 in the abutment nut 303 to engage one end of the slot 307 (Fig. 21) and further rotation of the handle 317 will then cause the lock nut to be unscrewed and the pin 308 will drag the abutment nut 303 with it for unscrewing the same. When the nut 303 has reached the desired position, the handle 317 may be rotated in the opposite direction to turn the lock nut 305 relatively to the abutment nut 303 and cause the lock nut to again lock up the abutment nut 303. When it is desired to move the abutment nut 303 in the opposite direction the lock nut 305 is first loosened, as heretofore described, and the handle 317 then shifted to cause the gear 316 to mesh with the gear 309 on the abutment nut 303 which may then be rotated by rotation of the handle 317 and during such rotation the lock nut 310 will be dragged along by means of the pin 308 engaging the slot 307. When the abutment nut 303 is in the desired position of adjustment, the handle 317 is again shifted to cause engagement between the gears 316, 310 and the lock nut rotated to lock up the abutment nut 303. It will be seen that when it is desired to remove the collet completely, the handle 317 may be shifted to unlock the lock nut 305 and continued rotation will unscrew both of the nuts 303—305 from the collet tube simultaneously and if the nut 305 engages the front plate 12, the collet will be forced out forwardly and when completely unscrewed from the nuts, the collet tube may be drawn out through the forward end of the spindle. When a new collet is inserted, the handle 317 may be shifted to engage the gear 316 with the gear 309 and the new collet screwed into the nuts. The slot 307 and pin 308 will always serve to hold the two nuts 303—305 in position so as to provide a continuous thread for initial engagement with the threaded end of the collet tube. It should be here stated that the collet tube is provided with a keyway for engagement with a key 318 carried by the sleeve 297.

The improved compensating mechanism (Figs. 20, 23, 24), designated generally 304 and interposed between the abutment collar 299 and the abutment nut 303, preferably comprises a two-part annular ring 319 carrying a plurality of headed pins 320 secured thereto. Between the head 321 of each pin and the ring 319 are interposed a plurality of cupped spring washers 322 and end abutment washers 323. These spring washers when in place are under an initial tension, that is to say, they are preloaded. The abutment nut 303 is provided with bores 324 for the reception of the heads 321 of the pins 320 and such recesses or bores are deep enough to permit sufficient inward movements of the heads for further compression of the compensating washers 322 occasioned by collet adjustment. The abutment nut 303 may carry locating and guiding pins 325 engaging between the two halves of the two-part ring 319, as shown particularly in Figs. 23 and 24. Each half of the ring 319 adjacent each parting line carries a pin 326. One of the pins carries a spring latch 327 while the opposite end of the latch engages over the pin on the other section of the ring 319. A tang 328 extends from each latch to such an extent that a screw driver or similar instrument may be inserted between the tang and the compensating washers for releasing the latch 327 and permitting separation of the two ring halves. If for any reason the compensator should become damaged or if a compensator having different characteristics is required, the nuts 303—305 may be backed off, the chucking sleeve 301 moved to the right as viewed in Fig. 20, and the two halves of the compensating ring 319 separated and removed from the spindle laterally; that is to say, the entire spindle assembly need not be dismantled for the purpose of changing compensators, and yet compensators may be very readily removed and replaced and when in place will be securely held not only by the spring latch clamps 327 but by the pins 325 and the engagement of the heads 321 of the pins in the recesses or bores 324 of the abutment nut 303.

It is highly important to prevent the spindle from being power rotated during such time that the gear 316 is in engagement with either the gear 309 or 310 and we have provided means for preventing power spindle rotation when the gear 316 is in position for collet adjustment. As shown particularly in Figs. 25, 26 and 27, the shaft 314 carrying the hand wheel 317 is provided with a longitudinally fixed collar 329 having a depression 330 therein for the reception of the spring pressed pin 274 when the shaft 314 is in the inoperative position, that is to say, when the gear 316 is out of engagement with either of the gears 309—310. When the handle 317 is shifted in either direction from that shown in Fig. 27, the spring pressed pin 274 rides up out of the groove 330 and the end of the pin engages a movable part of and opens the switch 275, which, as heretofore stated, is in the main line of the electric motor and the motor is stopped and consequently the spindles cannot rotate. The spring pressed pin 274 is the same pin heretofore described in connection with the stopping of the spindle rotation upon rocking of the handle 269 for the purpose of permitting safe and ready bumping of the stock in the spindle.

Hand cranking

The machine is equipped with means for manually rotating the crank shafts for setting up purposes and with interlocking means for preventing power actuation while the hand cranking mechanism is in place and for preventing the engagement of the hand cranking mechanism while the machine is in power operation. As shown particularly in Figs. 10, 30, 31 and 31a, the drive shaft 82 for the cam shafts is provided with a bevel gear 331 for engagement by a pinion 332 carried on shaft 333 operable by the hand crank 334. A spring pressed detent 335 serves to hold the shaft 333 either in disengaged position shown in Fig. 30 or in the inward or engaged position. When the gears 331—332 are engaged, all of the feed functions may be performed by hand rotation of the hand crank 334. However, in order to prevent both manual and power actuation of the cam shafts at the same time, I provide means for preventing the main feed clutch 70 from being engaged while the hand crank is in operative position. The clutch 70 controlling power operation is controlled by a manual handle 336 on a shaft 337 carrying the lever 338 for actuating the clutch rod 339, which in turn through suitable mechanism actuates the main feed clutch of the machine. The shaft 337 carries a second lever 340 to which is connected a link 341 pivotally secured to one end of the lever 342 pivoted to the frame of the machine. The opposite end of the lever 342 has a finger adjacent the shaft 333 and when the latter is retracted as shown in Fig. 31, the lever 342 may be freely rocked during movement of the main clutch lever 336. However, when the main feed clutch is engaged, the finger 343 engages behind a collar 344 fixed on the shaft 333 and the latter cannot be forced inwardly to cause engagement between bevel gears 331—332. When the main feed clutch is disengaged, the finger 343 is rocked out of the way of the collar 344 and the latter is positioned over the finger 343 when the shaft 33 is pushed in to engage the bevel gears for hand cranking operations. While the collar 344 is over the finger 343, the collar serves as an effective means to prevent rocking of the lever 342 with consequent engagement of the main feed clutch.

General operation

The machine may be set up for operation and all tool movements readily checked by hand cranking the machine by means illustrated in Figs. 30 and 31. During hand cranking, the operator may have perfect assurance that the power feed clutch will not be engaged with possible injury to himself. He is furthermore assured that when the hand cranking mechanism is engaged, the main feed clutch is of necessity disengaged.

When the machine is operating normally, the spindle carrier indexes and in the feed station the finished piece parts are accurately back-faced and cut off (Figs. 15, 16) and the stock stop thereafter is projected and the bar in the spindle fed out to provide stock for the next piece part. Between indexing movements the spindle carrier is very securely and rigidly held in engagement with the frame pads (Fig. 4) by means of the powerful toggle mechanism acting on the locating and locking lever positioned above the frame pads. At the proper point in the cycle of the machine when the spindle carrier is to be indexed the locating and locking lever releases the spindle carrier and the latter is raised at the front end free of the frame pads. During such raising of the spindle carrier the entire spindle carrier assembly, including the thrust abutment means therefor and various control and safety features, all rock as a unit about the pivot shafts 10 (Fig. 1).

When the bar stock in any spindle in feed station is about exhausted, that is to say when the stock is fed out against the stock stop so as to provide stock for the last piece part that it is deemed feasible to make from the bar, the tripper abutment 232 (Figs. 25, 26) is shifted out to tripping position by the feed slide during its abnormal feed movement. That particular spindle is then indexed through all of the work stations and the indexing movement of that spindle from the last work station back into the feed station causes the tripper abutment 232 to trip the stop mechanism of Fig. 25. The spindle then reaches the feed station where the last piece part from the exhausted bar is back-faced and cut off and the chuck is then opened and the feed slide partially fed forward to force the butt end of the bar part way out so that it can be removed. When the butt end has been released from the chuck and partially forced out, the main feed clutch is thrown out by means of the clutch throw out mechanism illustrated in Figs. 28 and 29. When the feed clutch has been disengaged the stock stop, which has been automatically projected downwardly into stock stopping position, may be retracted by the hand lever 210 and the exhausted butt then removed. Before inserting a new bar of stock, the operator rocks the hand lever 269 (Fig. 25) so as to withdraw the feed shoe from the feed tube spool and thus free the feed tube so as to facilitate bumping a new bar of stock. Simultaneously a switch in the main motor line is opened so as to stop the spindle rotation, the switch 242 for controlling the solenoid is relatched and the tripper abutment 232 and its associated parts reset to running position. A new bar of stock may then be bumped through the feed tube and into engagement with the projected stock stop. During bumping in of a bar of stock, the spool on the feed tube engages the return shoe of the feed slide. When the spindle has been restocked, the handle 269 (Fig. 25) is rocked back in a counterclockwise direction so as to close the switch 275 in the main motor line and to reengage the shoe 228 with the feed tube. The spindles may then be again put in rotation and the main feed clutch lever 336 actuated to throw in the feed clutch and again start the normal cycle of operations of the machine. Each time a bar of stock in a spindle runs out, the feed works will be thrown out automatically and there is no danger of a short feeding of stock, with consequent danger to tools, nor is there danger of the machine continuing to index without the production of piece parts.

When it is desired to adjust the collet, the hand crank 317 (Fig. 27) is moved longitudinally and then rotated so as to properly rotate the gears 309—310 (Fig. 20) and thus adjust the collet. When the crank 317 is in collet adjusting position, the switch 275 (Fig. 27) is opened by means of the cam surfaces of the groove 330 and there is no danger of having spindles power rotated while the collet adjustment is being made. The collet adjustment may be very easily tested by manual actuation thereof by the toggle means disclosed in Figs. 9—9a. When it becomes necessary to remove a collet from any spindle, the crank 317 may be moved the same as for collet adjustment and the crank rotated until the collet is unscrewed from the abutment nuts (Fig. 20) and either forced out or rendered removable through the front end of the spindle. The improved compensating means interposed in the chuck actuating mechanism and shown particularly in Figs. 20, 23 and 24 provides ordinarily sufficient compensation so that frequent collet adjustments are unnecessary but if for any reason a compensator is to be removed or replaced, such operation is very simple because of the accessibility of the handle 317 for unscrewing the abutment nuts of the collet and because the compensator is divided so as to be removed laterally from the spindle.

It will be apparent that the machine herein disclosed is very compact and relatively simple in construction. As will be clear from Figs. 1 and 2, all of the tools are in clear view out in front of the front wall of the frame. Operation of the tools may be readily observed and adjustments made with facility. The heavy tool slides provide great rigidity and the forming arms are very rigidly supported on short bearings in about the plane of the forming tools themselves. The cams for the forming tools are also substantially in line with the tools and the forming arm bearings so that there is substantially no overhang and very heavy yet accurately controlled forming cuts may be made. The method of supporting the feed and chucking slides on the tool slides makes for simplicity, compactness, and economy. The various automatic mechanisms for stopping the machine all make for economy of production in that the machine is not permitted to operate without doing useful work. The operator may restock the machine and make various adjustments with perfect assurance of his safety while so doing. In general it will be observed that, due to the various features herein disclosed, the down time of the machine will be reduced to a minimum and the machine will turn out accurately dimensioned piece parts with great economy.

While the invention has been described in considerable detail and a preferred form illustrated as embodied in a multiple spindle bar machine, it is to be understood that some features of the invention are applicable to machines of other types and that various modifications, additions, and omissions may be made within the scope of the invention as defined in the appended claims.

We claim:

1. In a machine of the character indicated, a frame, an indexible carrier carried thereby, carrier thrust means pivotally secured to said frame, means for connecting said carrier and thrust means, whereby said carrier is supported in part thereby, and means for raising said carrier and causing the same to pivot about the pivotal connection of said thrust means before indexing movements of said carrier.

2. In a machine of the character indicated, a frame, an indexible carrier, means for pivotally mounting one end of said carrier on said frame transversely of the axis of indexing, and means for moving the other end of said carrier about said pivot, for the purpose described.

3. In a machine of the character indicated, a frame, a thrust block pivotally mounted on said frame, an indexible carrier, means for rotatably carrying a part of said carrier on said thrust block, and means for raising part of said carrier to cause the same and said thrust block to pivot, for the purpose described.

4. In a machine of the character indicated, a frame, an indexible carrier, means for pivotally mounting said carrier on said frame upon an axis at an angle to the axis of indexing thereof, means for raising one end of said carrier and causing the same to pivot about said pivotal axis and holding said carrier in raised position during indexing movements of said carrier, and means for clamping said carrier in engagement with said frame between indexing movements thereof.

5. In a machine of the character indicated, a frame, an indexible carrier having a rearward extension thereon, means for pivotally mounting said rearward extension on said frame on an axis transverse to the axis of indexing thereof, means for clamping said carrier in engagement with said frame between indexing movements thereof, and means for moving said carrier out of engagement with said frame and about said transverse pivotal axis for indexing movements.

6. In a machine of the character indicated, a frame, an indexible carrier, a thrust block pivotally mounted on said frame on an axis transverse to the axis of indexing of said carrier, said carrier and thrust block having parts for longitudinal engagement with each other, whereby axial thrusts of said carrier are taken by said thrust block, means for raising one end of said carrier and causing the same and said thrust block to pivot about said pivotal axis for indexing movements of said carrier, and means for clamping said carrier in engagement with said frame between indexing movements thereof.

7. In a machine of the character indicated, a frame, an indexible carrier, a thrust plate carried by said carrier, a thrust block carried by said frame, said thrust block and plate being rotatable relatively to each other about the axis of indexing and being movable as a unit about another axis, means for moving said carrier and thrust block about said other axis to move said carrier out of engagement with said frame for indexing movements thereof, and means for clamping said carrier in engagement with said frame between indexing movements thereof.

8. In a machine of the character indicated, a frame, an indexible carrier, an indexing gear carried by said carrier, a thrust block housing said indexing gear and having means for taking axial thrusts of said carrier, means for moving said carrier out of engagement with said frame for indexing movements thereof, and means for clamping said carrier in engagement with said frame between indexing movements thereof.

9. In a machine of the character indicated, a frame, an indexible carrier, an indexing member carried thereby, thrust means for said carrier, said thrust means serving to enhouse said indexing member, means for mounting said indexing member on said thrust means to resist axial relative movement therebetween and permit relative rotation, means for pivotally mounting said thrust means on said frame, means for moving said carrier out of engagement with said frame and rocking the same about the pivotal axis of said thrust means for indexing movements of said carrier, and means for clamping said carrier in engagement with said frame between indexing movements thereof.

10. In a machine of the character indicated, a frame, an indexible carrier, means for raising said carrier out of engagement with said frame for indexing movements thereof, a single generally radially acting locating and locking means for said carrier, and a toggle for actuating the latter to force said carrier into engagement with said frame between indexing movements thereof.

11. In a machine of the character indicated, a frame, an indexible carrier, means for raising said carrier out of engagement with said frame for indexing movements thereof, and means including a toggle and acting on the top of said carrier in generally radial direction for forcing the same downwardly into engagement with said frame between indexing movements thereof.

12. In a machine of the character indicated, a frame, an indexible carrier, spaced supporting surfaces for said carrier on said frame, a combined locating and locking means for said carrier and engageable in a generally radial direction between said surfaces, and a toggle mechanism for moving said locating and locking means into and out of engagement with said carrier.

13. In a machine of the character indicated, a frame having an upstanding front wall, an indexible spindle carrier carried by said frame, a plurality of rotatable spindles in said carrier, a cam shaft carried by said frame, a plurality of tool holders supported from and at the front of said upstanding wall, said cam shaft having a cam in rear of said wall for actuating one of said tool holders, and a cam situated at the front of said wall for actuating another of said tool holders.

14. An open end machine including a frame having an upstanding front wall, an indexible spindle carrier carried by said frame, a plurality of rotatable spindles in said carrier, a cam shaft extending through said front wall, an end working tool holder, and a forming tool holder, said cam shaft having a cam in rear of said upstanding wall for actuating one of said tool holders and having a cam at the front side wall for actuating the other of said tool holders, for the purpose described.

15. An open end machine including a frame having an upstanding front wall, an indexible spindle carrier carried by said frame, a plurality of rotatable spindles carried by said carrier, an end working tool slide extending through said front wall, a forming tool holder at the front of said front wall, and a cam shaft having cams thereon for actuating both said tool holders, for the purpose described.

16. An open end machine including a frame having an upstanding front wall, an indexible spindle carrier indexibly supported by said frame, a plurality of spindles rotatably carried by said spindle carrier for supporting work at the front of said frame, an end working tool slide extending through said front wall adjacent each of the spindle stations, a forming tool support adjacent each of said stations, a plurality of cam shafts extending longitudinally of said spindle carrier axis, and cam means carried by each of said cam shafts for actuating the tools adjacent said spindle stations.

17. An open end machine of the character indicated including a frame having an upstanding front wall, an indexible spindle carrier carried by said frame, a plurality of spindles rotatably mounted in said spindle carrier for supporting work at the front of said upstanding front wall, end working and forming tool supports adjacent each of the spindle stations of said carrier, cam shafts corresponding in number to said spindle stations and extending through said upstanding wall, cams on said cam shafts at the front of said wall for actuating tools adjacent said spindle stations, and cams in rear of said wall for actuating other of said tools.

18. In a machine of the character indicated, a frame, a work carrier supported thereby, said frame having an upstanding front wall, a bushing member mounted on said front wall, a tool support mounted for movement within said bushing, a second tool support mounted for movement on the outside of said bushing, and means for actuating both of said tool supports.

19. In a machine of the character indicated, a frame, a work carrier supported thereby, a bushing fixed to said frame, a tool slide slidably and rotatably mounted in said bushing, cam means for actuating said tool slide both longitudinally and angularly, a second tool support mounted substantially concentrically of said tool slide, and means for actuating said second tool support.

20. In a machine of the character indicated, a frame, a work carrier supported thereby, a tool support mounted for movement on said frame, a cam roller adjustably carried by said tool support, and a cam for actuating said cam roller.

21. In a machine of the character indicated, a frame, a work carrier supported thereby, a plurality of tool supports to carry tools for simultaneously working on the same piece of work carried by said work carrier, a lever for actuating one of said tool supports, a lever for actuating the other of said tool supports, slot and follower sliding means for coupling said levers together, whereby one actuates the other, and cam means for actuating one of said levers, for the purpose described.

22. In a machine of the character indicated, a frame, a work carrier supported thereby, a plurality of tool supports for carrying tools positioned to simultaneously work on the same piece of work carried by said work carrier, a long lever for actuating one of said tool supports for feeding the same at a rapid rate, a short lever for feeding the other of said tools at a slower rate, and a common cam means for actuating both of said tool supports.

23. In a machine of the character indicated, a frame, a work carrier supported thereby, said frame having an upstanding front wall, a tool slide extending through said wall, cam means in rear of said wall for actuating said tool slide, a drive shaft extending longitudinally through said tool slide, a tool bracket carrying a rotary tool actuated by said tool slide, and means for gearing said shaft to said rotary tool.

24. In a machine of the character indicated, a frame, a work carrier supported thereby, a bracket carried by said frame, a stock stop housing adjustably carried by said bracket, an adjustable stop to limit movement of said housing on said bracket in one direction, and means for actuating a stock stop member in said housing to project and retract the same.

25. In a machine of the character indicated, a frame, a rotary spindle carrier mounted thereon, a plurality of rotatable spindles carried by said spindle carrier, a drive gear on each spindle, an internal gear surrounding said drive gears and meshing therewith for driving the latter, gear means for driving said annular gear, an annular supporting member carried by each of said spindles adjacent said drive gears, and an annular supporting ring carried by said annular gear and contacting with each of said annular supporting members carried by said spindles, the internal diameter of said supporting ring carried by said internal gear being of the same pitch diameter as said internal gear, whereby upon rotation of said internal gear said supporting rings on said spindles and on said internal gear will roll on each other and said internal gear will be supported by said annular members on said spindles.

26. In a machine of the character indicated, a rotatable spindle, means for driving the same, collet adjusting mechanism for said spindle, and control means for preventing said drive means from driving said spindle while said collet adjusting means is operative.

27. In a machine of the character indicated, a rotatable spindle, means for rotating the same, a chuck carried thereby, means for adjusting said chuck, and means for preventing said spindle rotating means from rotating said spindle while said chuck adjusting means is operative.

28. In a machine of the character indicated, a frame, a rotatable spindle carried therefrom, a chuck for said spindle, chuck adjusting means including a manually operable member associated with said frame and movable into position for chuck adjustment, means for rotating said spindle, electric switch means controlling said spindle rotating means, and means actuated by said manually movable means when moved to chuck adjusting position for controlling said switch for stopping spindle rotation.

29. In a machine of the character indicated, a frame, an indexible spindle carrier mounted thereon, a plurality of rotatable spindles carried by said spindle carrier, stock feed means for feeding stock in each spindle when in loading station, a tripper actuable by said stock feed means to move the same to abnormal position upon an abnormal feeding movement of said stock feed means, and means including means operable by said tripper when in said abnormal position for stopping the operation of said machine.

30. In a machine of the character indicated, a frame, an indexible spindle carrier carried thereby, a plurality of rotatable spindles carried by said spindle carrier, clutch means for controlling the feed functions of said machine, electrical means for controlling said clutch means, a switch for controlling said electrical means, stock feed means for feeding stock in each spindle when in feed station, a tripper abutment, said stock feed means being operable to move said tripper abutment to abnormal position upon an abnormal movement of said stock feed means, and trigger mechanism actuable by said tripper abutment upon an indexing movement of said spindle carrier for controlling said switch.

31. In a machine of the character indicated, a frame, an indexible spindle carrier thereon, a plurality of rotatable spindles carried by said spindle carrier, stock feed means for feeding stock in each spindle when in feed station, a tripper actuable upon an abnormal movement of said stock feed means, trigger mechanism to cooperate with and be sprung by said tripper upon an indexing movement of said spindle carrier, reset means for said trigger mechanism including means for moving said tripper back to normal position, and means controlled by said trigger mechanism for stopping said machine.

32. In a machine of the character indicated, a rotatable spindle, stock feed means for feeding stock in said spindle, a tripper operable upon an abnormal movement of said stock feed means, a trigger mechanism operable by said tripper when in abnormal position controlling machine stopping means, and reset means for said trigger mechanism including means for moving said tripper back to normal position when said trigger mechanism is reset.

33. In a machine of the character indicated, an indexible carrier, a plurality of chucks carried thereby, means for actuating each chuck when in feed station and including a movable member movable with said spindle carrier, and latch means for holding said movable member in chuck closed position when each spindle is in work station.

34. In a machine of the character indicated, a rotatable carrier, a plurality of chucks carried thereby, a movable chucking member for each spindle and movable with said spindle carrier, means cooperable with each said chucking member when in feed station, and a latch member for holding each of said movable chucking members in chuck closed position while in feed stations.

35. In a machine of the character indicated, an indexible spindle carrier, a plurality of spindles carried thereby, chucks carried by said spindles, a chucking member for each spindle and movable with said spindle carrier, an actuating member for actuating each said chucking member when in feed station, and latch means between said spindle carrier and chucking member and operable to hold each said chucking member in chuck closed position during indexing of said spindle carrier.

36. In a machine of the character indicated, an indexible spindle carrier, a plurality of rotatable spindles carried thereby, a chuck carried by each spindle, means for actuating each chuck including a chucking fork movably carried by said spindle carrier, a chucking slide cooperable with each said chucking fork in feed station, for actuating said chuck, and a latch carried by each said fork member and cooperable with a keeper on said spindle carrier to hold each said chucking fork in chuck closed position in all work stations of said spindle carrier.

37. In a machine of the character indicated, an indexible spindle carrier, a plurality of chucks carried thereby, a chuck actuator for each chuck and movable with said spindle carrier, a chucking means engageable with each said chuck actuator when in feed station, and latch means for holding each said chuck actuator in chuck closed position in all work stations, said latch means of a chuck in feed station being engageable by said chucking means when in feed station for releasing each said chuck actuator from said spindle carrier to permit actuation thereof, for the purpose described.

38. In a machine of the character indicated, a frame, an indexible carrier assembly thereon, a plurality of chucks carried by said assembly, chuck adjusting means having a remote control manual actuator mounted on said carrier assembly, and means for moving said carrier assembly and chuck adjusting and control means as a unit to separate a part of said carrier assembly and frame for indexing.

39. In a machine of the character indicated, a frame, an indexible carrier assembly thereon, a plurality of chucks carried by said assembly, automatic stop mechanism mounted on said carrier assembly, and means for moving said carrier assembly and automatic stop mechanism as a unit to separate a part of said carrier assembly and frame for indexing.

40. In a machine of the character indicated, a frame, an indexible carrier assembly thereon, a plurality of rotatable spindles carried by said carrier assembly, manually operable spindle stopping means bodily carried by said assembly, and means for moving said spindle carrier assembly and spindle stopping means as a unit to separate a part of said spindle carrier assembly and frame for indexing.

41. An open end machine of the character indicated, including a frame having an upstanding front wall, an indexible spindle carrier carried by said frame, a plurality of spindles rotatably mounted in said spindle carrier for supporting work at the front of said upstanding front wall, tool supports adjacent at least some of the spindle stations of said carrier, cam shaft means extending through said upstanding wall, cams on said cam shaft means at the front of said wall for actuating some of said tools, and cams in rear of said wall for actuating the other of said tools.

42. In a machine of the character indicated, including a frame having an upstanding front wall, an indexible spindle carrier carried by said frame, means for indexing the same, a plurality of spindles rotatably mounted in said spindle carrier for supporting work at the front of said upstanding front wall, an end working tool support and a forming tool support, said tool supports being concentrically mounted adjacent one of the spindle stations of said carrier on an axis eccentric to the axis of said spindle carrier.

43. In a machine of the character indicated, including a frame having an upstanding front wall, an indexible spindle carrier carried by said frame, a plurality of spindles rotatably mounted in said spindle carrier for supporting work at the front of said upstanding front wall, an end working tool support mounted in said front wall eccentrically of the axis of said spindle carrier for carrying a tool for acting on work in one spindle station, and a forming tool support concentrically mounted relatively to said end working tool support for carrying a forming tool to act on work carried by said carrier in one spindle station.

44. In a machine of the class described, a frame, a rotary spindle carrier mounted thereon, a plurality of rotary spindles mounted in said carrier, a drive gear carried by each spindle, means for securing said drive gears to said spindles, an internal gear surrounding all of said drive gears and meshing therewith, means for driving said internal gear, said gear securing means having flanges for axially positioning said internal gear.

45. In a machine of the character indicated, a frame, a rotary spindle carrier mounted thereon, a plurality of rotatable spindles mounted in said carrier, a flanged sleeve in threaded engagement with each spindle for securing said drive gear thereto, an internal gear surrounding all said drive gears and meshing therewith, means for driving said internal gear, a roll ring carried by said internal gear, the inside diameter of said roll ring being the same as the pitch diameter of said internal gear, and the external diameter of the flanged sleeve being the same as the pitch diameter of the spindle gears for engagement with the inside diameter of said roll ring, said internal gear and roll ring being held in axial position by the flanges of said flanged sleeves.

46. In a machine of the character described, a frame, a carrier mounted for rotation therein, a plurality of spindles rotatably mounted in said carrier, drive gears for said spindles, flanged sleeves for securing said drive gears to said spindles, a ring gear meshing with all of said drive gears, a roll ring carried by said ring gear for rolling engagement with said flanged sleeves, and additional supporting means in engagement with said roll ring, and between said spindles for rotatably supporting said ring gear.

DONALD H. MONTGOMERY.
ARTHUR H. JOBERT.